United States Patent
Nose et al.

(10) Patent No.: US 11,623,634 B2
(45) Date of Patent: Apr. 11, 2023

(54) HYBRID VEHICLE AND CONTROL METHOD THEREFOR

(71) Applicant: TOYOTA JIDOSHA KABUSHIKI KAISHA, Aichi-ken (JP)

(72) Inventors: Yuki Nose, Nagoya (JP); Masaaki Kobayashi, Seto (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 110 days.

(21) Appl. No.: 16/923,090

(22) Filed: Jul. 8, 2020

(65) Prior Publication Data

US 2021/0107451 A1    Apr. 15, 2021

(30) Foreign Application Priority Data

Oct. 9, 2019   (JP) .............................. JP2019-186128

(51) Int. Cl.
 *B60W 20/16* (2016.01)
 *F02D 41/00* (2006.01)
 (Continued)

(52) U.S. Cl.
 CPC ............ *B60W 20/16* (2016.01); *B60W 10/06* (2013.01); *B60W 10/08* (2013.01); *F01N 3/035* (2013.01);
 (Continued)

(58) Field of Classification Search
 CPC ...... B60W 20/16; B60W 10/06; B60W 10/08; B60W 2510/068; F01N 3/2006;
 (Continued)

(56) References Cited

U.S. PATENT DOCUMENTS 4,007,590 A * 2/1977 Nagai ................... F02D 41/025
 60/284
5,644,913 A * 7/1997 Iwai .................... F02D 41/1446
 60/284
 (Continued)

FOREIGN PATENT DOCUMENTS

JP   2004218541 A   8/2004
JP    200936173 A   2/2009
 (Continued)

OTHER PUBLICATIONS

Unpublished U.S. Appl. No. 17/029,043, filed Sep. 23, 2020, 64pp.
Unpublished U.S. Appl. No. 17/060,088, filed Oct. 1, 2020, 57pp.

Primary Examiner — Sizo B Vilakazi
Assistant Examiner — Brian R Kirby
(74) Attorney, Agent, or Firm — Hauptman Ham, LLP

(57) ABSTRACT

A hybrid vehicle includes a multi-cylinder engine, an exhaust gas control apparatus including a catalyst for removing exhaust gas from the multi-cylinder engine, an electric motor, and a control device configured to execute catalyst temperature increase control for stopping fuel supply to at least one cylinder and making an air-fuel ratio in each of remaining cylinders rich in a case where a temperature increase of a catalyst is requested during a load operation of the multi-cylinder engine, execute control such that an electric motor supplements insufficient drive power due to the execution of the catalyst temperature increase control, and change the air-fuel ratio in at least one of the remaining cylinders to a lean side after a temperature of the exhaust gas control apparatus becomes equal to or higher than a determination threshold value during the execution of the catalyst temperature increase control.

12 Claims, 13 Drawing Sheets

(51) Int. Cl.
 *F02D 41/02* (2006.01)
 *B60W 10/08* (2006.01)
 *F01N 3/20* (2006.01)
 *B60W 10/06* (2006.01)
 *F01N 3/035* (2006.01)

(52) U.S. Cl.
 CPC ......... *F01N 3/2006* (2013.01); *F02D 41/008* (2013.01); *F02D 41/025* (2013.01)

(58) Field of Classification Search
 CPC ............. F01N 2430/02; F01N 2430/06; F02D 41/008; F02D 41/025; F02D 41/0087; F02D 41/024; F02D 41/027; F02D 41/0275; F02D 41/029; B60Y 2300/474
 USPC .................................................. 701/102–103
 See application file for complete search history.

(56) References Cited

U.S. PATENT DOCUMENTS

| | | | | |
|---|---|---|---|---|
| 5,845,492 A | * | 12/1998 | Isobe | F01N 3/32 60/284 |
| 5,867,982 A | * | 2/1999 | Tengblad | F01N 3/20 60/284 |
| 5,930,992 A | * | 8/1999 | Esch | F02D 41/068 60/284 |
| 5,992,143 A | * | 11/1999 | Manaka | F02D 41/024 60/284 |
| 6,032,753 A | * | 3/2000 | Yamazaki | B60L 15/20 903/905 |
| 6,205,776 B1 | * | 3/2001 | Otsuka | F02D 41/1487 123/492 |
| 6,938,598 B1 | * | 9/2005 | Lewis | F02D 41/0002 123/179.3 |
| 7,069,910 B2 | * | 7/2006 | Surnilla | F02D 41/0275 123/481 |
| 8,200,382 B2 | * | 6/2012 | Hahn | B60W 20/15 180/65.21 |
| 8,931,255 B2 | * | 1/2015 | Wilson | F02D 41/405 123/481 |
| 2003/0074891 A1 | * | 4/2003 | Tamura | F01N 3/2006 60/285 |
| 2003/0121249 A1 | * | 7/2003 | Foster | F01N 3/0842 60/285 |
| 2004/0098970 A1 | * | 5/2004 | Foster | F02D 41/0255 60/284 |
| 2006/0130459 A1 | * | 6/2006 | Warner | F01N 3/023 60/285 |
| 2008/0109125 A1 | * | 5/2008 | Hahn | B60W 10/06 903/945 |
| 2009/0118969 A1 | * | 5/2009 | Heap | B60W 10/06 701/102 |
| 2009/0118985 A1 | * | 5/2009 | Whitney | F02D 41/0087 701/105 |
| 2010/0037595 A1 | * | 2/2010 | Kaneko | F01N 13/107 60/299 |
| 2011/0047980 A1 | * | 3/2011 | Santoso | B60W 10/08 60/285 |
| 2013/0079960 A1 | * | 3/2013 | Brennan | F02D 41/0087 180/65.21 |
| 2013/0095002 A1 | * | 4/2013 | In | F01N 13/0097 502/34 |
| 2013/0311021 A1 | * | 11/2013 | Mitsutani | B60W 20/00 903/903 |
| 2017/0350362 A1 | * | 12/2017 | Glugla | F02P 17/12 |
| 2018/0099656 A1 | | 4/2018 | Otsuka et al. | |
| 2019/0170052 A1 | * | 6/2019 | Dudar | F02D 41/047 |
| 2019/0368437 A1 | * | 12/2019 | Solomon | F02D 9/02 |

FOREIGN PATENT DOCUMENTS

| | | |
|---|---|---|
| JP | 2009248698 A | 10/2009 |
| JP | 2011069281 A | 4/2011 |
| JP | 201862199 A | 4/2018 |

* cited by examiner

HYBRID VEHICLE AND CONTROL METHOD THEREFOR

INCORPORATION BY REFERENCE

The disclosure of Japanese Patent Application No. 2019-186128 filed on Oct. 9, 2019 including the specification, drawings and abstract is incorporated herein by reference in its entirety.

BACKGROUND

1. Technical Field

The present disclosure relates to a hybrid vehicle including a multi-cylinder engine, an exhaust gas control apparatus including a catalyst for removing exhaust gas from the multi-cylinder engine, and an electric motor, and a control method therefor.

2. Description of Related Art

In the related art, a control device that, in a case where an SOx poisoning amount of a catalyst device disposed in an exhaust passage of an internal combustion engine exceeds a predetermined value, executes catalyst temperature increase control (dither control) for setting an air-fuel ratio of a part of cylinders (rich cylinders) to rich and setting an air-fuel ratio of a part of cylinders (lean cylinders) to lean is known (for example, see Japanese Unexamined Patent Application Publication No. 2004-218541 (JP 2004-218541 A)). The control device makes a degree of richness of a rich cylinder and a degree of leanness of a lean cylinder different between an initial stage of the start of the temperature increase control and a later stage. The control device changes the degree of richness and the degree of leanness over time from the start of the temperature increase control such that the degree of richness and the degree of leanness at the initial stage of the start of the temperature increase control become small. With this, it is possible to increase the temperature of the catalyst device while suppressing the occurrence of misfire in the lean cylinder.

In related art, a control device that executes, as catalyst temperature increase control for warming up a catalyst device that removes exhaust gas from an internal combustion engine, sequentially executes ignition timing retard control, fuel cut and rich control and lean and rich control (dither control) is known (for example, see Japanese Unexamined Patent Application Publication No. 2011-069281 (JP 2011-069281 A)). The ignition timing retard control is control for retarding an ignition timing and warming up the catalyst device using high-temperature exhaust gas. The fuel cut and rich control is control for making a cylinder, to which fuel injection is stopped while an intake valve and an exhaust valve are operated, and a cylinder, to which fuel is injected such that an air-fuel ratio is made rich, alternately appear. The fuel cut and rich control is executed for about three seconds in a case where a temperature of a catalyst inlet reaches a first temperature under the ignition timing retard control. With this, oxygen and unburned gas are sent to the catalyst device, and the catalyst device is warmed up by reaction heat of an oxidation reaction. Then, the lean and rich control is executed until a temperature of the catalyst outlet reaches the second temperature after the temperature of the catalyst inlet reaches a second temperature higher than the first temperature.

In the related art, as a control device of a hybrid vehicle including an internal combustion engine and an electric motor, a control device is known that stops fuel supply to each cylinder of the internal combustion engine in a case where requested power to the internal combustion engine becomes less than a threshold value, and executes control such that an electric motor outputs torque based on requested torque and correction torque at a timing when a correction start time has elapsed from a fuel cut start timing. The control device predicts the shortest time and the longest time from the fuel cut start timing until torque shock due to fuel cut occurs based on a rotation speed and the number of cylinders of the internal combustion engine, and sets a time between the shortest time and the longest time as the correction start time. The correction torque is determined to cancel torque shock that is applied to a drive shaft.

SUMMARY

However, even though the catalyst temperature increase control of the related art described above is executed, in a case where an environmental temperature is low or in a case where a requested temperature to the catalyst temperature increase control is high, sufficient air, that is, oxygen may not be sent to the catalyst device and the catalyst device may not be sufficiently increased in temperature. The amount of oxygen requested for regeneration of the catalyst or a particulate filter of the exhaust gas control apparatus is hardly introduced into the exhaust gas control apparatus under the catalyst temperature increase control of the related art. On the other hand, in a case where the catalyst temperature increase control is executed during a load operation of the internal combustion engine, there is a need to suppress deterioration of drivability of a vehicle in which the internal combustion engine is mounted.

Accordingly, the present disclosure provides a technique for sufficiently and quickly increasing a temperature of a catalyst of an exhaust gas control apparatus and supplying a sufficient amount of oxygen to the exhaust gas control apparatus while suppressing deterioration of drivability of a vehicle during a load operation of a multi-cylinder engine.

A first aspect of the present disclosure relates to a hybrid vehicle. The hybrid vehicle includes a multi-cylinder engine, an exhaust gas control apparatus, an electric motor, and an electric power storage device. The exhaust gas control apparatus includes a catalyst. The catalyst is configured to remove exhaust gas from the multi-cylinder engine. The electric power storage device is configured to exchange electric power with the electric motor. At least one of the multi-cylinder engine and the electric motor outputs drive power to wheels. The hybrid vehicle further includes a control device. The control device is configured to execute catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine, execute control such that the electric motor supplements insufficient drive power due to the execution of the catalyst temperature increase control, and change the air-fuel ratio in at least one of the remaining cylinders to a lean side after a temperature of the exhaust gas control apparatus becomes equal to or higher than a determination threshold value determined in advance during the execution of the catalyst temperature increase control.

A second aspect of the present disclosure relates to a control method for a hybrid vehicle. The hybrid vehicle includes a multi-cylinder engine, an exhaust gas control apparatus, an electric motor, and an electric power storage device. The exhaust gas control apparatus includes a catalyst. The catalyst is configured to remove exhaust gas from the multi-cylinder engine. The electric power storage device is configured to exchange electric power with the electric motor. At least one of the multi-cylinder engine and the electric motor outputs drive power to wheels. The control method includes executing catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine, executing control such that the electric motor supplements insufficient drive power due to the execution of the catalyst temperature increase control, and changing the air-fuel ratio in at least one of the remaining cylinders to a lean side after a temperature of the exhaust gas control apparatus becomes equal to or higher than a determination threshold value determined in advance during the execution of the catalyst temperature increase control.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
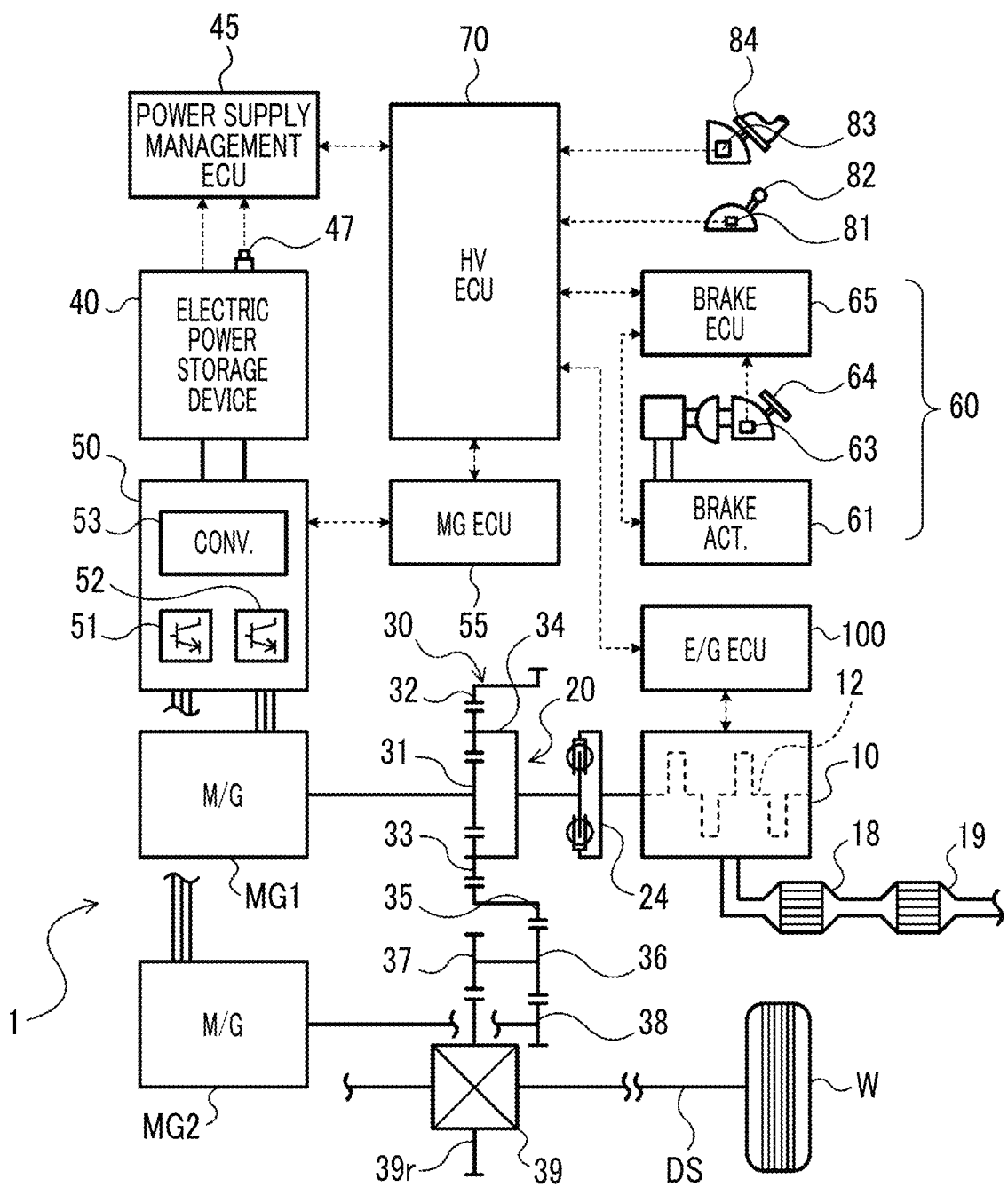
FIG. 1 is a schematic configuration diagram showing a hybrid vehicle of the present disclosure.

Next, a mode for carrying out the present disclosure will be described referring to the drawings.

FIG. 1 is a schematic configuration diagram showing a hybrid vehicle 1 of the present disclosure. The hybrid vehicle 1 shown in the drawing includes multi-cylinder engine (hereinafter, simply referred to as an "engine") 10 including a plurality (in the embodiment, for example, four) of cylinders (combustion chamber) 11, a single-pinion type planetary gear 30, motor generators MG1, MG2, both of which are synchronous motor generators (three-phase alternating-current electric motors), an electric power storage device (battery) 40, an electric power control unit (hereinafter, referred to as "PCU") 50 that is connected to the electric power storage device 40 and drives the motor generators MG1, MG2, an electronically controlled hydraulic braking device 60 that is able to provide frictional braking force to wheels W, and a hybrid electronic control unit (hereinafter, referred to as "HVECU") 70 that controls the entire vehicle.

Figure 2:
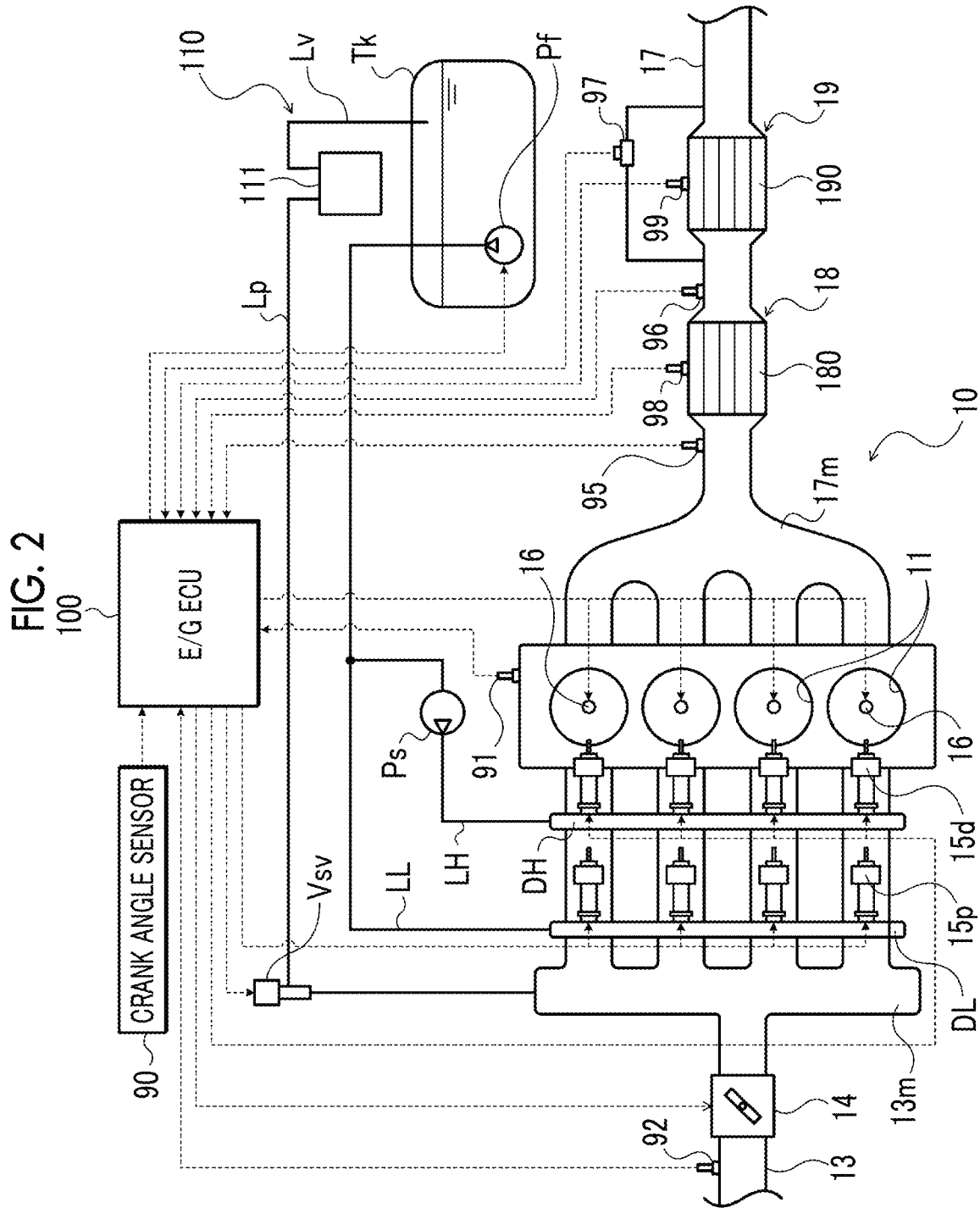
FIG. 2 is a schematic configuration diagram showing a multi-cylinder engine included in the hybrid vehicle of FIG. 1.

The engine 10 is an in-line gasoline engine (internal combustion engine) that converts reciprocating motion of pistons (not shown) accompanied by combustion of an air-fuel mixture of hydrocarbon based fuel and air in a plurality of cylinders 11 into rotational motion of a crankshaft (output shaft) 12. As shown in FIG. 2, the engine 10 includes an intake pipe 13, an intake manifold 13m, a throttle valve 14, a plurality of intake valves and a plurality of exhaust valves (not shown), a plurality of port injection valves 15p, a plurality of in-cylinder injection valves 15d, a plurality of ignition plugs 16, an exhaust manifold 17m, and an exhaust pipe 17. The throttle valve 14 is an electronically controlled throttle valve that is able to change a passage area in the intake pipe 13. The intake manifold 13m is connected to the intake pipe 13 and an intake port of each of the cylinders 11. Each of the port injection valves 15p injects fuel to the corresponding to intake port, and each of the in-cylinder injection valves 15d injects fuel directly to the corresponding cylinder 11. The exhaust manifold 17m is connected to an exhaust port of each of the cylinders 11 and the exhaust pipe 17.

The engine 10 includes a low-pressure delivery pipe DL connected to a feed pump (low-pressure pump) Pf through a low-pressure fuel supply pipe LL and a high-pressure delivery pipe DH connected to a supply pump (high-pressure pump) Ps through a high-pressure fuel supply pipe LH. A fuel inlet of each of the port injection valves 15p is connected to the low-pressure delivery pipe DL, and a fuel inlet of each of the in-cylinder injection valves 15d is connected to the high-pressure delivery pipe DH. The feed pump Pf is an electric pump including a motor that is driven with electric power from an accessory battery (not shown). Fuel from the feed pump Pf is stored in the low-pressure delivery pipe DL and is supplied from the low-pressure delivery pipe DL to the respective port injection valves 15p. The supply pump Ps is a piston pump (mechanical pump) that is driven by, for example, the engine 10. High-pressure fuel from the supply pump Ps is stored in the high-pressure delivery pipe DH and is supplied from the high-pressure delivery pipe DH to the respective in-cylinder injection valves 15d.

As shown in FIG. 2, the engine 10 includes an evaporative fuel treatment device 110 that introduces evaporative fuel generated in a fuel tank Tk, which stores fuel, into the intake manifold 13m. The evaporative fuel treatment device 110 includes a canister 111 that has an adsorbent (activated carbon) adsorbing evaporative fuel in the fuel tank Tk, a vapor passage Lv that connects the fuel tank Tk and the canister 111, a purge passage Lp that connects the canister 111 and the intake manifold 13m, and a purge valve (vacuum switching valve) Vsv that is provided in the purge passage Lp. In the embodiment, the purge valve Vsv is a control valve that is able to regulate a valve opening degree.

The engine 10 includes, as an exhaust gas control apparatus, an upstream control apparatus 18 and a downstream control apparatus 19 incorporated in the exhaust pipe 17. The upstream control apparatus 18 includes an NOx storage type exhaust gas removing catalyst (three-way catalyst) 180 that removes harmful components, such as carbon monoxide (CO), HC, and NOx, in exhaust gas from the respective cylinders 11 of the engine 10. The downstream control apparatus 19 includes a particulate filter (GPF) 190 that is disposed downstream of the upstream control apparatus 18 and traps particulate matters (fine particles) in exhaust gas. In the embodiment, the particulate filter 190 carries an NOx storage type exhaust gas removing catalyst (three-way catalyst).

The engine 10 as described above is controlled by an engine electronic control unit (hereinafter, referred to as "engine ECU") 100. The engine ECU 100 includes a microcomputer having a CPU, a ROM, a RAM, an input/output interface, and the like (not shown), various drive circuits, various logic ICs, and the like, and executes intake air amount control, fuel injection control, and ignition timing control of the engine 10, purge control for controlling a purge amount of evaporative fuel in the evaporative fuel treatment device 110 (purge valve Vsv), and the like. The engine ECU 100 acquires detection values of a crank angle sensor 90, a coolant temperature sensor 91, an air flowmeter 92, an intake pressure sensor (not shown), a throttle valve position sensor (not shown), an upstream air-fuel ratio sensor 95, a downstream air-fuel ratio sensor 96, a differential pressure sensor 97, an upstream catalyst temperature sensor 98, a downstream catalyst temperature sensor 99, and the like through an input port (not shown).

The crank angle sensor 90 detects a rotation position (crank position) of the crankshaft 12. The coolant temperature sensor 91 detects a coolant temperature Tw of the engine 10. The air flowmeter 92 detects an intake air amount GA of the engine 10. The intake pressure sensor detects pressure in the intake pipe 13, that is, intake pressure. The throttle valve position sensor detects a valve body position (throttle position) of the throttle valve 14. The upstream air-fuel ratio sensor 95 detects an upstream air-fuel ratio AFf that is an air-fuel ratio of exhaust gas flowing into the upstream control apparatus 18. The downstream air-fuel ratio sensor 96 detects a downstream air-fuel ratio AFr that is an air-fuel ratio of exhaust gas flowing into the downstream control apparatus 19. The differential pressure sensor 97 detects differential pressure ΔP of exhaust gas between an upstream side and a downstream side of the downstream control apparatus 19, that is, the particulate filter 190. The upstream catalyst temperature sensor 98 detects a temperature (catalyst temperature) Tct of the upstream control apparatus 18, that is, the exhaust gas removing catalyst 180. The downstream catalyst temperature sensor 99 detects a temperature (catalyst temperature) Tpf of the downstream control apparatus 19, that is, the particulate filter 190.

The engine ECU 100 calculates a rotation speed Ne of the engine 10 (crankshaft 12) based on the crank position from the crank angle sensor 90. The engine ECU 100 calculates (estimates) a deposition amount Dpm of the particulate matters in the particulate filter 190 of the downstream control apparatus 19 at each predetermined time using either of an operation history method according to an operation state or the like of the engine 10 or a differential pressure method. In a case where the differential pressure method is used, the engine ECU 100 calculates the deposition amount Dpm based on the differential pressure ΔP detected by the differential pressure sensor 97, that is, pressure loss in the particulate filter 190 due to deposition of the particulate matters. In a case where the operation history method is used, the engine ECU 100 calculates the deposition amount Dpm (present value) by adding an estimated increase amount (positive value) or an estimated decrease amount (negative value) of particulate matters according to the operation state of the engine 10 to a previous value of the deposition amount Dpm. The estimated increase amount of the particulate matters is calculated, for example, as a product of an estimated emission amount of particulate matters calculated from the rotation speed Ne of the engine 10, a load factor, and the coolant temperature Tw, an emission factor, and trapping efficiency of the particulate filter 190. The estimated decrease amount of the particulate matters is calculated, for example, as a product of an amount of combustion of particulate matters calculated from the previous value of the deposition amount Dpm, an inflow air amount, and the temperature Tpf of the particulate filter 190, and a correction coefficient.

The engine 10 may be a diesel engine including a diesel particulate filter (DPF) or may be an LPG engine. The temperature Tct or Tpf of the exhaust gas removing catalyst 180 or the particulate filter 190 may be estimated based on the intake air amount GA, the rotation speed Ne, a temperature of exhaust gas, the upstream air-fuel ratio AFf, the downstream air-fuel ratio AFr, and the like.

The planetary gear 30 is a differential rotation mechanism including a sun gear (first element) 31, a ring gear (second element) 32, and a planetary carrier (third element) 34 that rotatably supports a plurality of pinion gears 33. As shown in FIG. 1, a rotor of the motor generator MG1 is coupled to the sun gear 31, and the crankshaft 12 of the engine 10 is connected to the planetary carrier 34 through a damper mechanism 24. The ring gear 32 is integrated with a counter drive gear 35 as an output member, and both gears rotate coaxially and integrally.

The counter drive gear 35 is coupled to right and left wheels (drive wheels) W through a counter driven gear 36 that meshes with the counter drive gear 35, a final drive gear (drive pinion gear) 37 that rotates integrally with the counter driven gear 36, a final driven gear (differential ring gear) 39r that meshes with the final drive gear 37, a differential gear 39, and a drive shaft DS. With this, the planetary gear 30, a gear train of the counter drive gear 35 to the final driven gear 39r, and the differential gear 39 constitute a transaxle 20 that transmits a part of output torque of the engine 10 as a power generation source to the wheels W and connects the engine 10 and the motor generator MG1 to each other.

A drive gear 38 is fixed to a rotor of the motor generator MG2. The drive gear 38 has the number of teeth smaller than the counter driven gear 36 and meshes with the counter driven gear 36. With this, the motor generator MG2 is connected to the right and left wheels W through the drive gear 38, the counter driven gear 36, the final drive gear 37, the final driven gear 39r, the differential gear 39, and the drive shaft DS.

The motor generator MG1 (second electric motor) mostly operates as a power generator that converts at least a part of power from the engine 10 in a load operation. The motor generator MG2 mostly operates as an electric motor that is driven with at least one of electric power from the electric power storage device 40 and electric power from the motor generator MG1 to generate drive torque in the drive shaft DS. That is, in the hybrid vehicle 1, the motor generator MG2 as a power generation source functions as a power generation device that outputs drive torque (drive power) to the wheels W attached to the drive shaft DS along with the engine 10. The motor generator MG2 outputs regenerative braking torque at the time of braking of the hybrid vehicle 1. The motor generators MG1, MG2 are able to exchange electric power with the electric power storage device 40 through the PCU 50 or exchange electric power with each other through the PCU 50.

The electric power storage device 40 is, for example, a lithium-ion secondary battery or a nickel-hydrogen secondary battery. The electric power storage device 40 is managed by a power supply management electronic control unit (hereinafter, referred to as "power supply management ECU") 45 that includes a microcomputer having a CPU, a ROM, a RAM, an input/output interface, and the like (not shown). The power supply management ECU 45 derives an SOC (charging rate), allowable charging electric power Win, allowable discharging electric power Wout, and the like of the electric power storage device 40 based on an inter-terminal voltage VB from a voltage sensor of the electric power storage device 40, a charging and discharging current IB from a current sensor, a battery temperature Tb from a temperature sensor 47 (see FIG. 1), and the like.

The PCU 50 includes a first inverter 51 that drives the motor generator MG1, a second inverter 52 that drives the motor generator MG2, a boost converter (voltage conversion module) 53 that boosts electric power from the electric power storage device 40 and deboosts electric power from the motor generators MG1, MG2 side. The PCU 50 is controlled by a motor electronic control unit (hereinafter, referred to as "MGECU") 55 that includes a microcomputer having a CPU, a ROM, a RAM, an input/output interface, and the like (not shown), various drive circuits, various logic ICs, and the like. The MGECU 55 acquires a command signal from the HVECU 70, a voltage before boosting and a voltage after boosting of the boost converter 53, detection values of a resolver (not shown) that detects rotation positions of the rotors of the motor generators MG1, MG2, phase currents that are applied to the motor generators MG1, MG2, and the like. The MGECU 55 executes switching control of the first and second inverters 51, 52 or the boost converter 53 based on the signals and the like. The MGECU 55 calculates rotation speed Nm1, Nm2 of the rotors of the motor generators MG1, MG2 based on the detection values of the resolver.

The hydraulic braking device 60 includes a master cylinder, a plurality of brake pads that sandwiches brake discs attached to the wheels W to provide braking torque (frictional braking torque) to the corresponding wheels, a plurality of wheel cylinders (all not shown) that drives the corresponding brake pads, a hydraulic brake actuator 61 that supplies hydraulic pressure to the respective wheel cylinders, and a brake electronic control unit (hereinafter, referred to as "brake ECU") 65 that controls the brake actuator 61, and the like. The brake ECU 65 includes a microcomputer having a CPU, a ROM, a RAM, an input/output interface, and the like (not shown). The brake ECU 65 acquires a command signal from the HVECU 70, a brake pedal stroke BS (a depression amount of a brake pedal 64) detected by a brake pedal stroke sensor 63, a vehicle speed V detected by a vehicle speed sensor (not shown), and the like. The brake ECU 65 controls the brake actuator 61 based on the signals and the like.

The HVECU 70 includes a microcomputer having a CPU, a ROM, a RAM, an input/output interface, and the like (not shown), various drive circuits, various logic ICs, and the like. The HVECU 70 exchanges information (communication frames) with the ECUs 100, 45, 55, 65 through a public communication line (multiplex communication bus) that is a CAN bus including two communication lines (wire harness) of Lo and Hi. The HVECU 70 is connected individually to each of the ECUs 100, 45, 55, 65 through a dedicated communication line (local communication bus) that is a CAN bus including two communication lines (wire harness) of Lo and Hi. The HVECU 70 exchanges information (communication frames) individually with each of the ECUs 100, 45, 55, 65 through the corresponding dedicated communication line. The HVECU 70 acquires a signal from a start switch (not shown) for instructing a system start of the hybrid vehicle 1, a shift position SP of a shift lever 82 detected by a shift position sensor 81, an accelerator operation amount Acc (a depression amount of an accelerator pedal 84) detected by an accelerator pedal position sensor 83, the vehicle speed V detected by the vehicle speed sensor (not shown), the crank position from the crank angle sensor 90 of the engine 10, and the like. The HVECU 70 acquires the SOC (charging rate), the allowable charging electric power Win, and the allowable discharging electric power Wout of the electric power storage device 40 from the power supply management ECU 45, the rotation speed Nm1, Nm2 of the motor generators MG1, MG2 from the MGECU 55, and the like.

The HVECU 70 derives requested torque Tr* (including requested braking torque) to be output to the drive shaft DS corresponding to the accelerator operation amount Acc and the vehicle speed V from a requested torque setting map (not shown) at the time of traveling of the hybrid vehicle 1. The HVECU 70 sets requested traveling power Pd* (=Tr*×Nds) requested for traveling of the hybrid vehicle 1 based on the requested torque Tr* or a rotation speed Nds of the drive shaft DS. The HVECU 70 determines whether or not to make the engine 10 perform the load operation based on the requested torque Tr* or the requested traveling power Pd*, separately set target charging and discharging electric power Pb* or the allowable discharging electric power Wout of the electric power storage device 40, or the like.

In a case where the engine 10 should be made to perform the load operation, the HVECU 70 sets requested power Pe*(=Pd*−Pb*+Loss) to the engine 10 based on the requested traveling power Pd*, the target charging and discharging electric power Pb*, or the like. The HVECU 70 sets a target rotation speed Ne* of the engine 10 according to the requested power Pe* such that the engine 10 is efficiently operated and falls below a lower limit rotation speed Nelim according to a driving state or the like of the hybrid vehicle 1. The HVECU 70 sets torque commands Tm1*, Tm2* to the motor generators MG1, MG2 according to the requested torque Tr*, the target rotation speed Ne*, or the like within a range of the allowable charging electric power Win and the allowable discharging electric power Wout of the electric power storage device 40. On the other hand, in a case where the operation of the engine 10 should be stopped, the HVECU 70 set the requested power Pe*, the target rotation speed Ne*, and the torque command Tm1* to zero. The HVECU 70 sets the torque command Tm2* within the range of the allowable charging electric power Win and the allowable discharging electric power Wout of the electric power storage device 40 such that torque according to the requested torque Tr* is output from the motor generator MG2 to the drive shaft DS.

Then, the HVECU 70 transmits the requested power Pe* and the target rotation speed Ne* to the engine ECU 100, and transmits the torque commands Tm1*, Tm2* to the MGECU 55. The engine ECU 100 executes the intake air amount control, the fuel injection control, the ignition timing control, and the like based on the requested power Pe* and the target rotation speed Ne*. In the embodiment, the engine ECU 100 basically executes the fuel injection control such that an air-fuel ratio in each of the cylinders 11 of the engine 10 becomes a stoichiometric air-fuel ratio (=14.6 to 14.7). In a case where a load (requested power Pe*) of the engine 10 is equal to or less than a predetermined value, fuel is injected from the respective port injection valves 15*p*, and fuel injection from the respective in-cylinder injection valves 15*d* is stopped. While the load of the engine 10 exceeds the predetermined value, fuel injection from the respective port injection valves 15*p* is stopped, and fuel is injected from the respective in-cylinder injection valves 15*d*. In the embodiment, fuel injection to the cylinders 11 and ignition are executed in an order (ignition order) of a first cylinder #1→a third cylinder #3→a fourth cylinder #4→a second cylinder #2.

The MGECU 55 executes the switching control of the first and second inverters 51, 52 or the boost converter 53 based on the torque commands Tm1*, Tm2*. In a case where the engine 10 is in the load operation, control is executed such that the motor generators MG1, MG2 converts a part (at the time of charging of the electric power storage device 40) or the whole (at the time of discharging of the electric power storage device 40) of power output from the engine 10 along with the planetary gear 30 into torque and outputs torque to the drive shaft DS. With this, the hybrid vehicle 1 performs traveling (HV traveling) with power (directly transmitted torque) from the engine 10 and power from the motor generator MG2. In contrast, in a case where the operation of the engine 10 is stopped, the hybrid vehicle 1 executes traveling (EV traveling) solely with power (drive torque) from the motor generator MG2.

Here, as described above, the hybrid vehicle 1 of the embodiment includes, as an exhaust gas control apparatus, the downstream control apparatus 19 having the particulate filter 190. The deposition amount Dpm of the particulate matters in the particulate filter 190 increases with an increase in traveling distance of the hybrid vehicle 1, and increases as the environmental temperature is lower. Accordingly, in the hybrid vehicle 1, when the deposition amount Dpm of the particulate matters in the particulate filter 190 increases, there is a need to send a large amount of air, that is, oxygen to the particulate filter 190, which is sufficiently increased in temperature, and to combust the particulate matters to regenerate the particulate filter 190. For this reason, in the hybrid vehicle 1, when the engine 10 is in the load operation according to the depression amount of the accelerator pedal 84 by a driver of the hybrid vehicle 1, a particulate filter regeneration need determination routine illustrated in FIG. 3 is executed at each predetermined time by the engine ECU 100.

Figure 3:
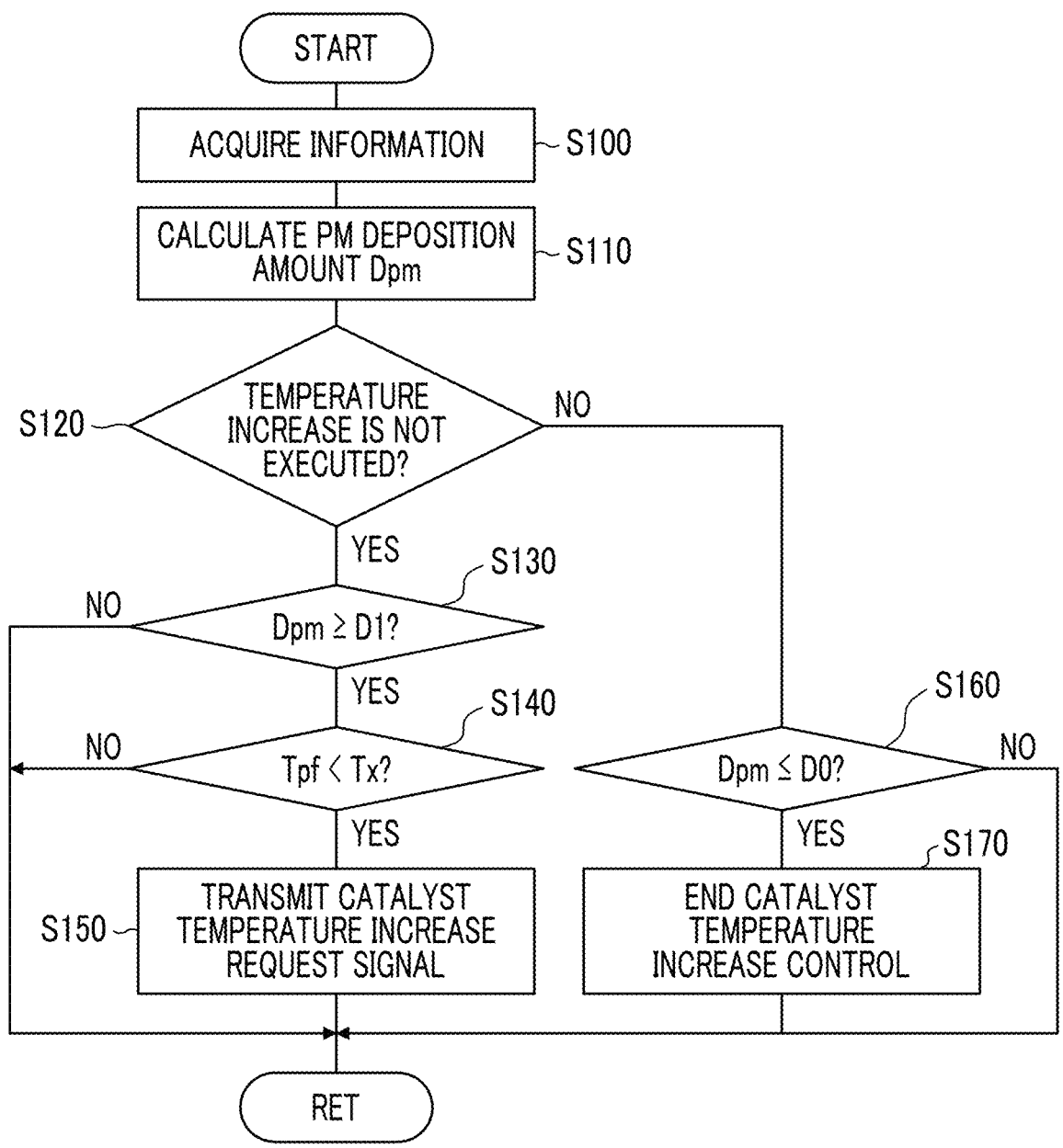
FIG. 3 is a flowchart illustrating a particulate filter regeneration need determination routine that is executed in the hybrid vehicle of FIG. 1.

At the time of the start of the routine of FIG. 3, the engine ECU 100 acquires information needed for determination, such as the intake air amount GA or the rotation speed Ne of the engine 10, the coolant temperature Tw, and the temperature Tpf of the particulate filter 190 (Step S100). The engine ECU 100 calculates the deposition amount Dpm of the particulate matters in the particulate filter 190 based on physical quantity and the like acquired in Step S100 using either of the operation history method according to the operation state or the like of the engine 10 or the differential pressure method (Step S110). Next, the engine ECU 100 determines whether or not a catalyst temperature increase control routine for increasing the temperature of the exhaust gas removing catalyst 180 of the upstream control apparatus 18 and the temperature of the particulate filter 190 of the downstream control apparatus 19 is already executed (Step S120).

In a case where determination is made in Step S120 that the catalyst temperature increase control routine is not executed (Step S120: YES), the engine ECU 100 determines whether or not the deposition amount Dpm calculated in Step S110 is equal to or greater than a threshold value D1 (for example, a value of about 5000 mg) determined in advance (Step S130). In a case where determination is made in Step S130 that the deposition amount Dpm is less than the threshold value D1 (Step S130: NO), the engine ECU 100 ends the routine of FIG. 3 at this point of time once. In a case where determination is made in Step S130 that the deposition amount Dpm is equal to or greater than the threshold value D1 (Step S130: YES), the engine ECU 100 determines whether or not the temperature Tpf of the particulate filter 190 acquired in Step S100 is lower than a temperature increase control start temperature (predetermined temperature) Tx determined in advance (Step S140). The temperature increase control start temperature Tx is determined in advance according to a use environment of the hybrid vehicle 1, and in the embodiment, is, for example, a temperature near 600° C.

In a case where determination is made in Step S140 that the temperature Tpf of the particulate filter 190 is equal to or higher than the temperature increase control start temperature Tx (Step S140: NO), the engine ECU 100 ends the routine of FIG. 3 at this point of time once. In a case where determination is made in Step S140 that the temperature Tpf of the particulate filter 190 is lower than the temperature increase control start temperature Tx (Step S140: YES), the engine ECU 100 transmits a catalyst temperature increase request signal for requesting the execution of the catalyst temperature increase control routine to the HVECU 70 (Step S150), and ends the routine of FIG. 3 once. In a case where the execution of the catalyst temperature increase control routine is permitted by the HVECU 70 after the transmission of the catalyst temperature increase request signal, the engine ECU 100 turns on a catalyst temperature increase flag and starts the catalyst temperature increase control routine.

On the other hand, in a case where determination is made in Step S120 that the catalyst temperature increase control routine is already executed (Step S120: NO), the engine ECU 100 determines whether or not the deposition amount Dpm calculated in Step S110 is equal to or less than a threshold value D0 (for example, a value of about 3000 mg) determined to be smaller than the threshold value D1 in advance (Step S160). In a case where determination is made in Step S160 that the deposition amount Dpm is greater than the threshold value D0 (Step S160: NO), the engine ECU 100 ends the routine of FIG. 3 at this point of time once. In a case where determination is made in Step S160 that the deposition amount Dpm is equal to or less than the threshold value D0 (Step S160: YES), the engine ECU 100 turns off the catalyst temperature increase flag and ends the catalyst temperature increase control routine (Step S170), and ends the routine of FIG. 3.

Figure 4:
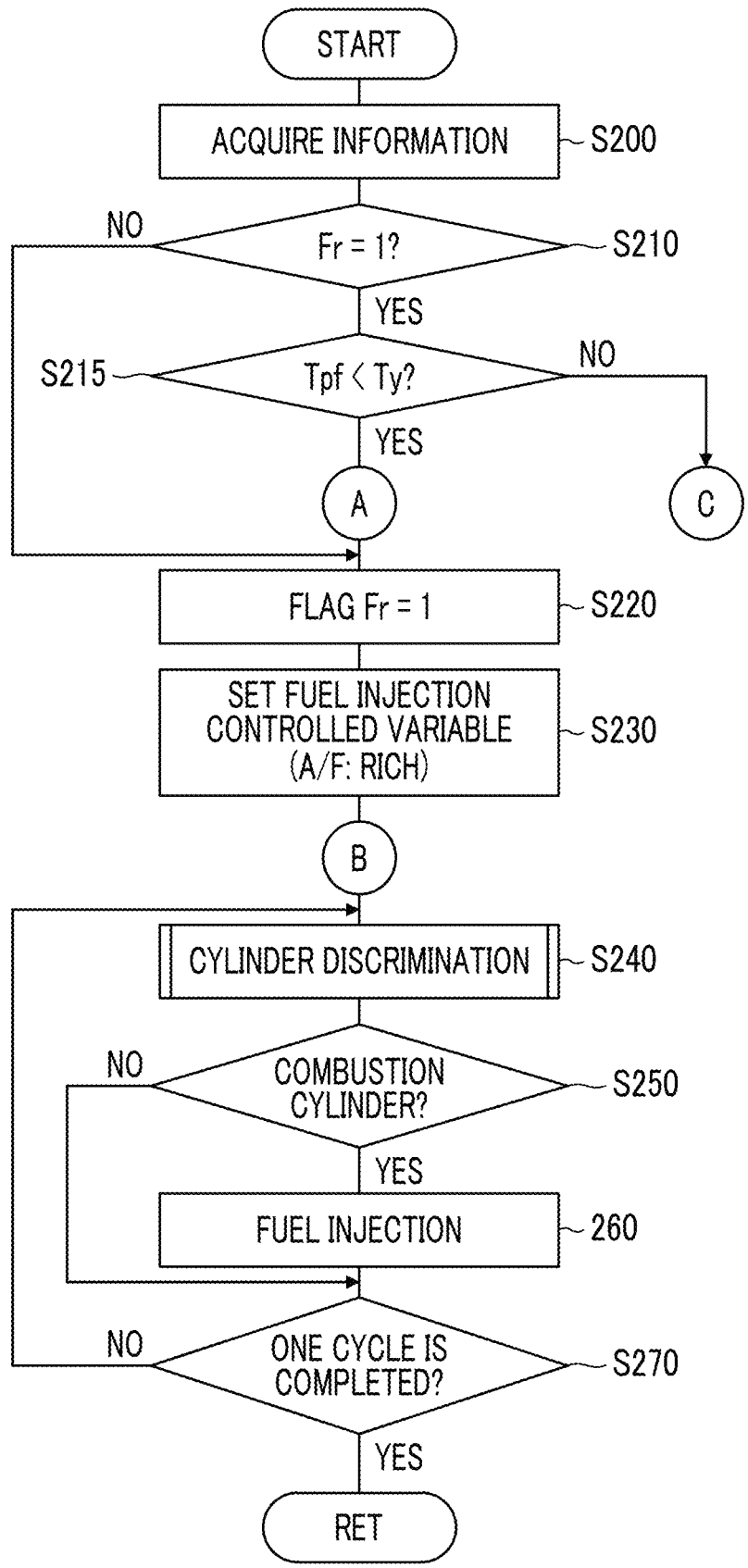
FIG. 4 is a flowchart illustrating a catalyst temperature increase control routine that is executed in the hybrid vehicle of FIG. 1.

Subsequently, the catalyst temperature increase control routine for increasing the temperature of the exhaust gas removing catalyst 180 and the temperature of the particulate filter 190 will be described. FIG. 4 is a flowchart illustrating the catalyst temperature increase control routine that is executed by the engine ECU 100 at each predetermined time. The routine of FIG. 4 is executed until the catalyst temperature increase flag is turned off in Step S170 of FIG. 3 under a condition that the execution of the routine is permitted by the HVECU 70 while the engine 10 is in the load operation according to the depression amount of the accelerator pedal 84 by the driver.

At the time of the start of the routine of FIG. 4, the engine ECU 100 acquires information needed for control, such as the intake air amount GA or the rotation speed Ne of the engine 10, the coolant temperature Tw, the temperature Tpf of the particulate filter 190, the crank position from the crank angle sensor 90, and the requested power Pe* and the target rotation speed Ne* from the HVECU 70 (Step S200). After the processing of Step S200, the engine ECU 100 determines whether or not a richness flag Fr is a value 0 (Step S210). Before the start of the routine of FIG. 4, the richness flag Fr is set to the value 0, and in a case where determination is made in Step S210 that the richness flag Fr is the value 0 (Step S6210: YES), the engine ECU 100 sets the richness flag Fr to a value 1 (Step S220).

Next, the engine ECU 100 sets fuel injection controlled variables, such as a fuel injection amount or a fuel injection end timing, from the respective port injection valves 15p or the respective in-cylinder injection valves 15d (Step S230). In Step S230, the engine ECU 100 makes the fuel injection amount to one cylinder 11 (for example, a first cylinder #1) zero among a plurality of cylinders 11 of the engine 10. In Step S230, the engine ECU 100 increases the fuel injection amount to each of the remaining cylinders 11 (for example, a second cylinder #2, a third cylinder #3, and a fourth cylinder #4) other than the one cylinder 11 by, for example, 20% to 25% (in the embodiment, 20%) of the fuel injection amount, which should be intrinsically supplied to the one cylinder 11 (the first cylinder #1).

After the fuel injection controlled variables are set in Step S230, the engine ECU 100 discriminates the cylinder 11, the fuel injection start timing of which is reached, based on the crank position from the crank angle sensor 90 (Step S240). In a case where determination is made through the discrimination processing of Step S240 that the fuel injection start timing of the one cylinder 11 (the first cylinder #1) is reached (Step S250: NO), the engine ECU 100 does not perform fuel injection from the port injection valve 15p or the in-cylinder injection valve 15d corresponding to the one cylinder 11, and determines whether or not one cycle of fuel injection, in which the engine 10 is rotated twice, is completed (Step S270). While the fuel supply to the one cylinder 11 (the first cylinder #1) is stopped (during fuel cut), the intake valve and the exhaust valve of the cylinder 11 are opened and closed in the same manner as in a case where fuel is supplied. In a case where determination is made through the discrimination processing of Step S240 that the fuel injection start timing of one of the remaining cylinders 11 (the second cylinder #2, the third cylinder #3, or the fourth cylinder #4) is reached (Step S250: YES), the engine ECU 100 performs fuel inject from the port injection valve 15p or the in-cylinder injection valve 15d to the cylinder 11 (Step S260), and determines whether or not one cycle of fuel injection is completed (Step S270).

In a case where determination is made in Step S270 that one cycle of fuel injection is not completed (Step s270: NO), the engine ECU 100 repeatedly executes the processing of Steps S240 to S260. While the routine is executed, an opening degree of the throttle valve 14 is set based on the requested power Pe* and the target rotation speed Ne* (requested torque). Accordingly, through the processing of Steps S240 to S270, the fuel supply to the one cylinder 11 (the first cylinder #1) is stopped, and the air-fuel ratio in each of the remaining cylinders 11 (the second cylinder #2, the third cylinder #3, and the fourth cylinder #4) is made rich. In the following description, the cylinder 11, to which the fuel supply is stopped, is appropriately referred to as a "fuel cut cylinder", and the cylinder 11, to which fuel is supplied, is appropriately referred to as a "combustion cylinder". In a case where determination is made in Step S270 that one cycle of fuel injection is completed (Step S270: YES), the engine ECU 100 executes the processing of Step S200 and subsequent steps again.

After the richness flag Fr is set to the value 1 in Step S220, the engine ECU 100 determines in Step S210 that the richness flag Fr is the value 1 (Step S210: YES). In this case, the engine ECU 100 determines whether or not the temperature Tpf of the particulate filter 190 acquired in Step S200 is lower than a regenerative temperature (first determination threshold value) Ty determined in advance (Step S215). The regenerative temperature Ty is a lower limit value of a temperature for allowing regeneration of the particulate filter 190, that is, combustion of the particulate matters or a temperature slightly higher than the lower limit value. The regenerative temperature Ty is determined in advance according to the use environment of the hybrid vehicle 1, and in the embodiment, is set to, for example, a temperature near 650° C. In a case where determination is made in Step S215 that the temperature Tpf of the particulate filter 190 is lower than the regenerative temperature Ty (Step S215: YES), the engine ECU 100 executes the processing of Steps S230 to S270 described above, and executes the processing of Step S200 and the subsequent steps again.

Figure 5:
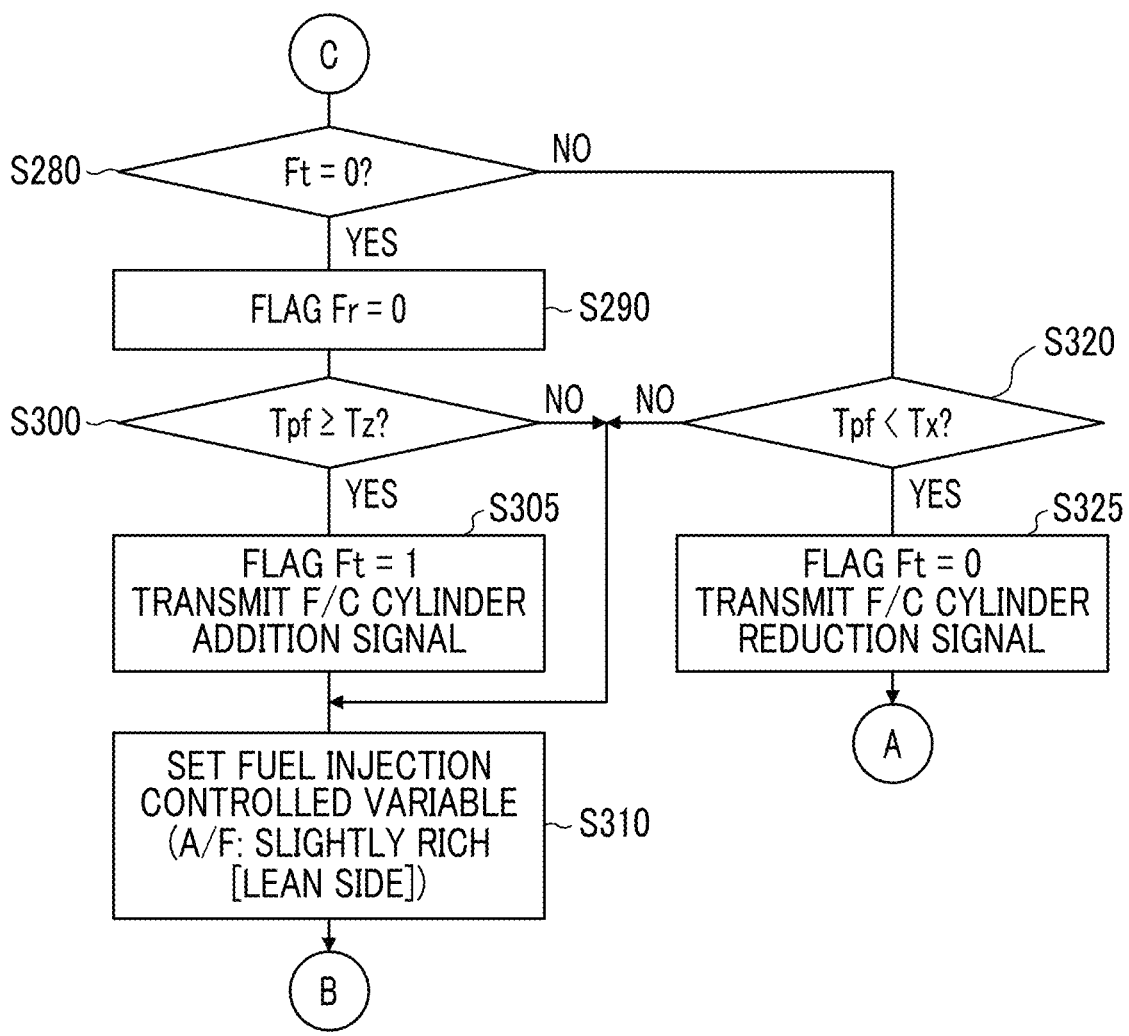
FIG. 5 is a flowchart illustrating the catalyst temperature increase control routine that is executed in the hybrid vehicle of FIG. 1.

In a case where determination is made in Step S215 that the temperature Tpf of the particulate filter 190 is equal to or higher than the regenerative temperature Ty (Step S215: NO), as shown in FIG. 5, the engine ECU 100 determines whether or not a high temperature flag Ft is a value 0 (Step S280). Before the start of the routine of FIG. 4, the high temperature flag Ft is set to the value 0, and in a case where determination is made in Step S280 that the high temperature flag Ft is the value 0 (Step S280: YES), the engine ECU 100 sets the richness flag Fr to the value 0 (Step S290). After the richness flag Fr is set to the value 0, the engine ECU 100 determines whether or not the temperature Tpf of the particulate filter 190 acquired in Step S200 is equal to or higher than a regeneration promotion temperature (second determination threshold value) Tz determined in advance (Step S300). The regeneration promotion temperature Tz is a temperature for allowing promotion of regeneration of the particulate filter 190, that is, combustion of the particulate matters. The regeneration promotion temperature Tz is determined in advance according to the use environment of the hybrid vehicle 1, and in the embodiment, is set to, for example, a temperature near 700° C.

In a case where determination is made in Step S300 that the temperature Tpf of the particulate filter 190 is lower than the regeneration promotion temperature Tz (Step S300: NO), the engine ECU 100 sets the fuel injection controlled variables, such as the fuel injection amount or the fuel injection end timing, from the respective port injection valves 15p or the respective in-cylinder injection valves 15d (Step S310). In Step S310, the engine ECU 100 makes the fuel injection amount to the fuel cut cylinder (the first cylinder #1) among the cylinders 11 zero. In Step S310, the engine ECU 100 increases the fuel injection amount to each of all combustion cylinders (the second cylinder #2, the third cylinder #3, and the fourth cylinder #4) other than the fuel cut cylinder (the first cylinder #1) by, for example, 3% to 7%

(in the embodiment, 5%) of the fuel injection amount, which should be intrinsically supplied to the fuel cut cylinder.

After the fuel injection controlled variables are set in Step S310, the engine ECU 100 repeatedly executes the processing of Steps S240 to S260 until determination is made in Step S270 that one cycle of fuel injection is completed. With this, the fuel supply to the one cylinder (fuel cut cylinder) 11 (the first cylinder #1) is stopped, the air-fuel ratio in each of the remaining cylinders (combustion cylinders) 11 (the second cylinder #2, the third cylinder #3, and the fourth cylinder #4) is changed to a lean side compared to a case where the processing of Step S230 is executed and is made slightly rich.

In a case where determination is made in Step S300 that the temperature Tpf of the particulate filter 190 is equal to or higher than the regeneration promotion temperature Tz (Step S300: YES), the engine ECU 100 sets the high temperature flag Ft to the value 1 (Step S305). In Step S305, the engine ECU 100 transmits an F/C cylinder addition request signal for requesting addition of a fuel cut cylinder to the HVECU 70. Then, the engine ECU 100 sets the fuel injection controlled variables of the respective port injection valves 15p or the respective in-cylinder injection valves 15d (Step S310), and repeatedly executes the processing of Steps S240 to S260 until determination is made in Step S270 that one cycle of fuel injection is completed.

In the embodiment, the engine ECU 100 sets the high temperature flag Ft to the value 1 in Step S305, and then, transmits the F/C cylinder addition request signal to the HVECU 70 once in two cycles (four rotations of the engine 10). Permission and prohibition of addition of a fuel cut cylinder is determined by the HVECU 70. In a case where addition of a fuel cut cylinder is permitted by the HVECU 70, the engine ECU 100 selects (adds), as a new fuel cut cylinder, the cylinder 11 (in the embodiment, the fourth cylinder #4) to which fuel injection (ignition) is not executed successively with respect to the first cylinder #1 when the catalyst temperature increase control routine is not executed.

In a case where addition of a fuel cut cylinder is permitted by the HVECU 70, the engine ECU 100 makes the fuel injection amount to each of the fuel cut cylinders (the first cylinder #1 and the fourth cylinder #4) among the cylinders 11 zero in Step S310. In Step S310, the engine ECU 100 increases the fuel injection amount to each of all combustion cylinders (the second cylinder #2 and the third cylinder #3) other than the fuel cut cylinders by, for example, 3% to 7% (in the embodiment, 5%) of the fuel injection amount, which should be intrinsically supplied to one fuel cut cylinder. In this case, after the processing of Step S310, the engine ECU 100 executes the processing of Steps S240 to S270, and executes the processing of Step S200 and the subsequent steps again. With this, the fuel supply to the two cylinders 11 (the first cylinder #1 and the fourth cylinder #4) is stopped, and the air-fuel ratio in each of the remaining cylinders 11 (the second cylinder #2 and the third cylinder #3) is changed to a lean side compared to a case where the processing of Step S230 is executed and is made slightly rich.

After the high temperature flag Ft is set to the value 1 in Step S305, the engine ECU 100 determines in Step S280 that the high temperature flag Ft is the value 1 (Step S280: NO). In this case, the engine ECU 100 determines whether or not the temperature Tpf of the particulate filter 190 acquired in Step S200 is lower than the temperature increase control start temperature Tx (Step S320). In a case where determination is made in Step S320 that the temperature Tpf of the particulate filter 190 is equal to or higher than the temperature increase control start temperature Tx (Step S320: NO), the engine ECU 100 executes the processing of Steps S310 and S240 to S270, and executes the processing of Step S200 and the subsequent steps again. In contrast, in a case where determination is made in Step S320 that the temperature Tpf of the particulate filter 190 is lower than the temperature increase control start temperature Tx (Step S320: YES), the engine ECU 100 sets the high temperature flag Ft to the value 0 (Step S325). In Step S325, the engine ECU 100 transmits an F/C cylinder reduction signal to the HVECU 70 in order to notify of the restart of fuel supply to the previously added fuel cut cylinder (the fourth cylinder #4).

After the processing of Step S325, the engine ECU 100 sets the richness flag Fr to the value 1 again in Step S220 of FIG. 4. The engine ECU 100 makes the fuel injection amount to the fuel cut cylinder (first cylinder #1), to which the fuel supply is stopped continuously, zero, and increases the fuel injection amount to each of the remaining cylinders (combustion cylinders) 11 (the second cylinder #2, the third cylinder #3, and the fourth cylinder #4) by 20% of the fuel injection amount, which should be intrinsically supplied to the one fuel cut cylinder (first cylinder #1) (Step S230). With this, through the processing of Steps S240 to S270, the fuel supply of the one cylinder (fuel cut cylinder) 11 (the first cylinder #1) is stopped, and the air-fuel ratio in each of the remaining cylinders (combustion cylinder) 11 (the second cylinder #2, the third cylinder #3, and the fourth cylinder #4) is made rich again.

Figure 6A:
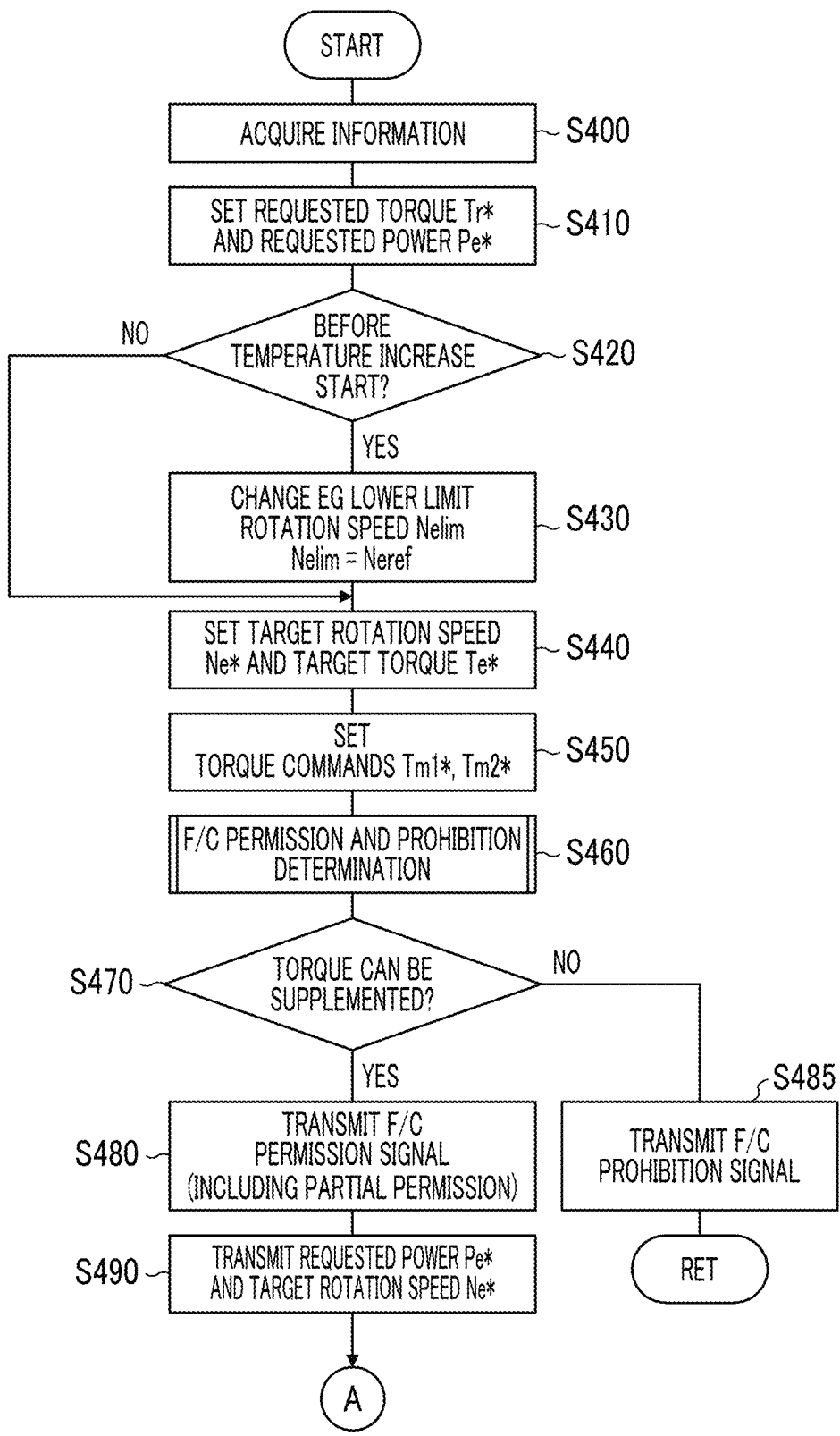
FIGS. 6A and 6B is a flowchart illustrating drive control routine that is executed in the hybrid vehicle of FIG. 1.
Figure 6B:
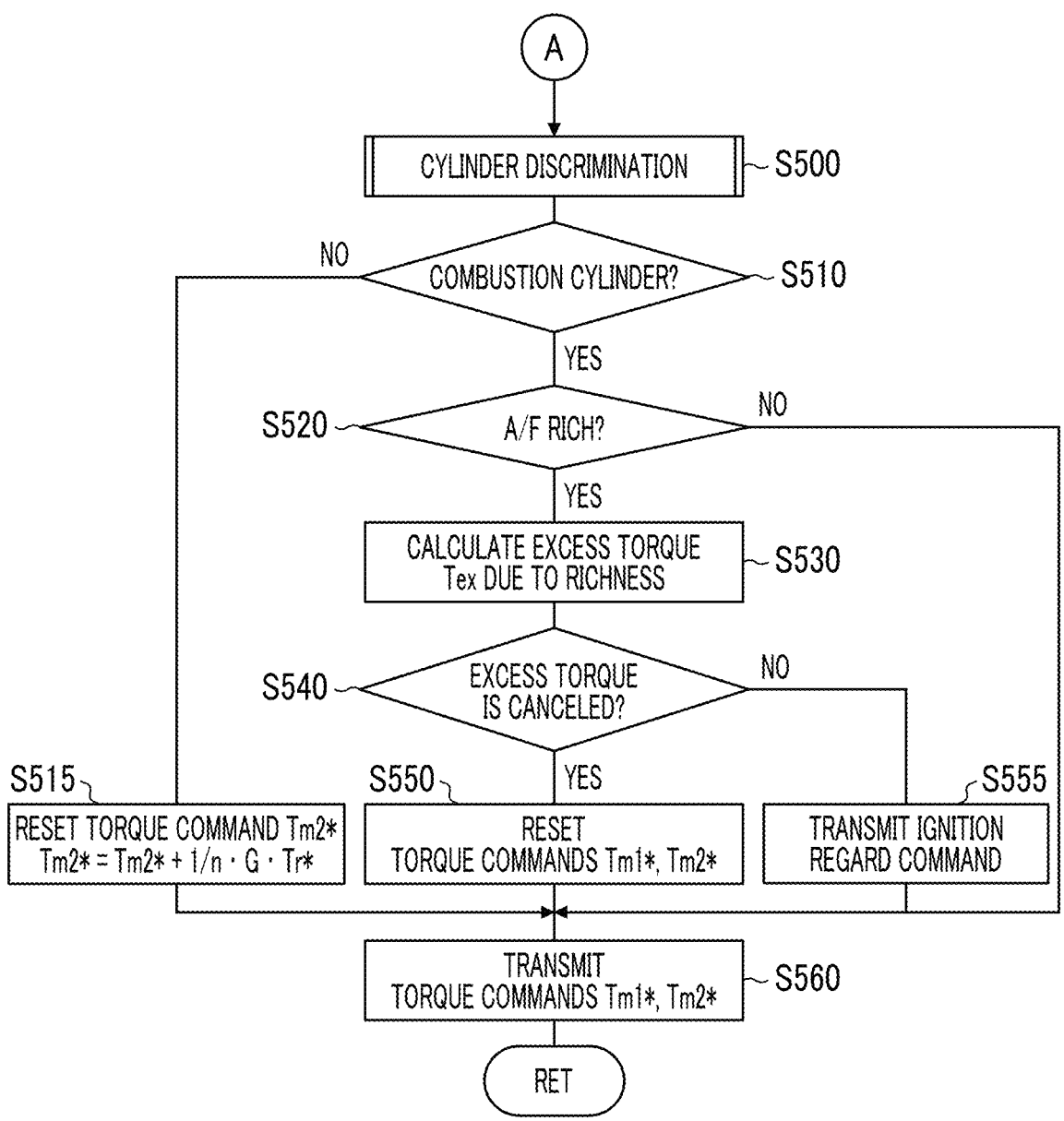

FIGS. 6A and 6B is a flowchart illustrating a drive control routine that is repeatedly executed by the HVECU 70 at each predetermined time in parallel with the above-described catalyst temperature increase control routine after the catalyst temperature increase request signal is transmitted from the engine ECU 100 in Step S150 of FIG. 3.

At the time of the start of the routine of FIGS. 6A and 6B, the HVECU 70 acquires information needed for control, such as the accelerator operation amount Acc, the vehicle speed V, the crank position from the crank angle sensor 90, the rotation speed Nm1, Nm2 of the motor generators MG1, MG2, the SOC, the target charging and discharging electric power Pb*, the allowable charging electric power Win, and the allowable discharging electric power Wout of the electric power storage device 40, the presence or absence of reception of the F/C cylinder addition request signal and the F/C cylinder reduction signal from the engine ECU 100, and the value of the richness flag Fr from the engine ECU 100 (Step S400). Next, the HVECU 70 sets the requested torque Tr* based on the accelerator operation amount Acc and the vehicle speed V, and sets the requested power Pe* to the engine 10 based on the requested torque Tr* (requested traveling power Pd*), the target charging and discharging electric power Pb* of the electric power storage device 40, or the like (Step S410).

The HVECU 70 determines whether or not the catalyst temperature increase control routine of FIGS. 4 and 5 is started by the engine ECU 100 (Step S420). In a case where determination is made in Step S420 that the catalyst temperature increase control routine is not started by the engine ECU 100 (Step S420: YES), the HVECU 70 sets a value Neref determined in advance as the lower limit rotation speed Nelim that is a lower limit value of the rotation speed of the engine 10 (Step S430). The value Neref is a value that is greater by about 400 to 500 rpm than the lower limit value of the rotation speed of the engine 10 when the catalyst temperature increase control routine is not executed. The processing of Step S430 is skipped after the catalyst temperature increase control routine is started by the engine ECU 100.

After the processing of Step S420 or S430, the HVECU 70 derives a rotation speed for efficiently operating the engine 10 corresponding to the requested power Pe* from a map (not shown) and sets a greater value between the derived rotation speed and the lower limit rotation speed Nelim as the target rotation speed Ne* of the engine 10 (Step S440). In Step S440, the HVECU 70 sets a value obtained by dividing the requested power Pe* by the target rotation speed Ne* as target torque Te* of the engine 10. The HVECU 70 sets the torque command Tm1* to the motor generator MG1 according to the target torque Te* and the target rotation speed Ne* and the torque command Tm2* to the motor generator MG2 according to the requested torque Tr* and the torque command Tm1* within the range of the allowable charging electric power Win and the allowable discharging electric power Wout of the electric power storage device 40 (Step S450).

Subsequently, the HVECU 70 determines whether or not to permit the execution of the catalyst temperature increase control routine, that is, the stop of the fuel supply to a part of cylinders 11 (hereinafter, "the stop of the fuel supply" is appropriately referred to as "fuel cut (F/C)") according to a request from the engine ECU 100 (Step S460). In Step S460, the HVECU 70 calculates drive torque that is insufficient due to fuel cut of one cylinder 11, that is, torque (hereinafter, appropriately referred to as "insufficient torque") that is not output from the engine 10 due to the fuel cut. In more detail, the HVECU 70 calculates insufficient torque (=Tr*·G/n) by multiplying a value obtained by dividing the requested torque Tr* set in Step S410 by the number n of cylinders (in the embodiment, n=4) of the engine 10 by a gear ratio G between the rotor of the motor generator MG2 and the drive shaft DS. In Step S460, the HVECU 70 determines whether or not the insufficient torque can be supplemented by the motor generator MG2 based on the insufficient torque, the torque commands Tm1*, Tm2* set in Step S450, and the allowable charging electric power Win and the allowable discharging electric power Wout of the electric power storage device 40. In this case, in a case where the F/C cylinder addition request signal or the F/C cylinder reduction signal is received from the engine ECU 100, the HVECU 70 determines a possibility of supplement of the insufficient torque in view of an increase or a decrease in the number of fuel cut cylinders.

As a result of the determination processing of Step S460, in a case where determination is made that insufficient drive torque due to the fuel cut of a part (one or two) of cylinders 11 can be supplemented from the motor generator MG2 (Step S470: YES), the HVECU 70 transmits a fuel cut permission signal to the engine ECU 100 (Step S480). The fuel cut permission signal also a fuel cut permission signal that permits solely fuel cut of one cylinder 11 when the F/C cylinder addition request signal is transmitted from the engine ECU 100. As the result of the determination processing of Step S460, in a case where determination is made that insufficient drive torque due to the fuel cut of a part of cylinders 11 cannot be supplemented from the motor generator MG2 (Step S470: NO), the HVECU 70 transmits a fuel cut prohibition signal to the engine ECU 100 (Step S485), and ends the routine of FIGS. 6A and 6B once. In this case, the execution of the catalyst temperature increase control routine by the engine ECU 100 is suspended or stopped.

In a case where the fuel cut permission signal is transmitted to the engine ECU 100 in Step S480, the HVECU 70 transmits the requested power Pe* set in Step S410 and the target rotation speed Ne* set in Step S440 to the engine ECU 100 (Step S490). The HVECU 70 discriminates the cylinder 11, the fuel injection start timing of which is next reached, based on the crank position of the crank angle sensor 90 (Step S500). In a case where determination is made through the discrimination processing of Step S500 that the fuel injection start timing of the fuel cut cylinder (the first cylinder #1 or the first cylinder #1 and the fourth cylinder #4) is reached (Step S510: NO), the HVECU 70 resets the torque command Tm2* to the motor generator MG2 (Step S515).

In Step S515, the HVECU 70 sets a sum of the torque command Tm2* set in Step S450 and the insufficient torque (=Tr*·G/n) as a new torque command Tm2*. After the processing of Step S515, the HVECU 70 transmits the torque command Tm1* in Step S450 and the torque command Tm2* reset in Step S515 to the MGECU 55 (Step S560), and ends the routine of FIGS. 6A and 6B once. With this, while the fuel supply to one cylinder 11 of the engine 10 is stopped (during fuel cut), control is executed by the MGECU 55 such that the motor generator MG1 rotates the engine 10 at the target rotation speed Ne*, and control is executed by the MGECU 55 such that the motor generator MG2 supplements the insufficient torque.

In contrast, in a case where determination is made through the discrimination processing of Step S500 that the fuel injection start timing of each of the combustion cylinders (the second cylinder #2 to the fourth cylinder #4 or the second cylinder #2 and the third cylinder #30068) is reached (Step S510: YES), the HVECU 70 determines whether or not the richness flag Fr acquired in Step S400 is the value 1 (Step S520). In a case where determination is made in Step S520 that the richness flag Fr is the value 1 (Step S520: YES), the HVECU 70 calculates excess torque Tex (positive value) of the engine 10 that occurs the richness of the air-fuel ratio in one combustion cylinder from the accelerator operation amount Acc or the target torque Te* and an increase rate (in the embodiment, 20%) of fuel in one combustion cylinder used in Step S230 of FIG. 4 (Step S530).

The HVECU 70 determines whether or not the electric power storage device 40 can be charged with electric power generated by the motor generator MG1 based on the excess torque Tex, the target rotation speed Ne* and the target torque Te* set in Step S440, the torque command Tm1* set in Step S450, and the allowable charging electric power Win of the electric power storage device 40, and the like in a case where the excess torque Tex is cancelled while the engine 10 is rotated at the target rotation speed Ne* by the motor generator MG1 (Step S540). In a case where determination is made in Step S540 that the excess torque Tex can be cancelled by the motor generator MG1 (Step S540: YES), the HVECU 70 resets the torque commands Tm1*, Tm2* in view of the excess torque Tex (Step S550).

In Step S550, the HVECU 70 adds a value (negative value) of a component in the excess torque Tex, which is applied to the motor generator MG1 through the planetary gear 30, to the torque command Tm1* set in Step S450 to set a new torque command Tm1*. In Step S550, the HVECU 70 subtracts a value (positive value) in the excess torque Tex, which is transmitted to the drive shaft DS through the planetary gear 30, from the torque command Tm2* to set a new torque command Tm2*. After the processing of Step S550, the HVECU 70 transmits the reset torque commands Tm1*, Tm2* to the MGECU 55 (Step S560), and ends the routine of FIGS. 6A and 6B once. With this, in a case where the excess torque Tex can be cancelled by the motor generator MG1, while fuel is supplied such that the air-fuel ratio in each of all combustion cylinders other than the fuel cut cylinder is made rich in Steps S230 to S270 of FIG. 4, control is executed by the MGECU 55 such that the motor generator MG1 rotates the engine 10 at the target rotation speed Ne* and converts surplus power of the engine 10 based on the excess torque Tex into electric power. In the interim, control is executed by the MGECU 55 such that the motor generator MG2 outputs torque according to the torque command Tm2* set in Step S450 without supplementing the insufficient torque.

Figure 7:
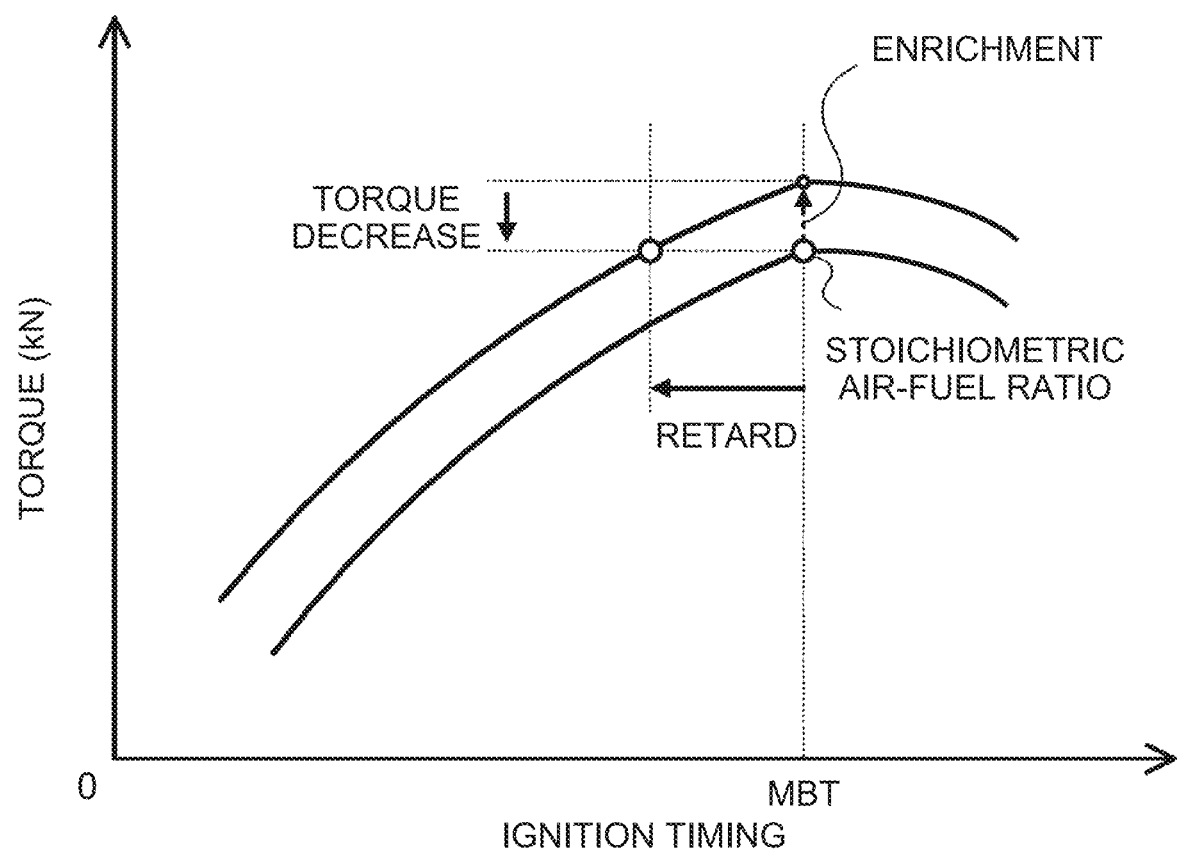
FIG. 7 is an explanatory view showing the relationship between torque output from a multi-cylinder engine and an ignition timing.

On the other hand, in a case where determination is made in Step S540 that the excess torque Tex cannot be cancelled by the motor generator MG1 (Step S540: YES), the HVECU 70 transmits an ignition retard request signal for requesting retard of an ignition timing to the engine ECU 100 (Step S555). The HVECU 70 transmits the torque commands Tm1*, Tm2* set in Step S450 to the MGECU 55 (Step S560), and ends the routine of FIGS. 6A and 6B once. With this, in a case where the excess torque Tex cannot be cancelled by the motor generator MG1, while fuel is supplied such that the air-fuel ratio in each of all combustion cylinders other than the fuel cut cylinder is made rich in Steps S230 to S270 of FIG. 4, control is executed by the MGECU 55 such that the motor generator MG1 rotates the engine 10 at the target rotation speed Ne*. In the interim, control is executed by the MGECU 55 such that the motor generator MG2 outputs torque according to the torque command Tm2* set in Step S450 without supplementing the insufficient torque. In a case where the ignition retard request signal from the HVECU 70 is received, as shown in FIG. 7, the engine ECU 100 retards the ignition timing in each of the combustion cylinders from an optimum ignition timing (MBT) such that the output torque of the engine 10 becomes the same as in a case where the air-fuel ratio in each of the combustion cylinders is set to a stoichiometric air-fuel ratio.

In a case where determination is made in Step S520 that the richness flag Fr is the value 0 (Step S520: NO), the HVECU 70 transmits the torque commands Tm1*, Tm2* set in Step S450 to the MGECU 55 (Step S550), and ends the routine of FIGS. 6A and 6B once. With this, while the richness flag Fr is the value 0, and fuel is supplied such that the air-fuel ratio in each of all combustion cylinders other than the fuel cut cylinder becomes a value (slightly rich) on the lean side in Steps S310 and S240 to S270 of FIG. 4, control is executed by the MGECU 55 that the motor generator MG1 rotates the engine 10 at the target rotation speed Ne*. In the meantime, control is executed by the MGECU 55 such that the motor generator MG2 outputs torque according to the torque command Tm2* set in Step S450 without supplementing the insufficient torque.

As a result of the execution of the routines of FIGS. 3 to 6A and 6B described above, in the hybrid vehicle 1, in a case where the deposition amount Dpm of the particulate matters in the particulate filter 190 of the downstream control apparatus 19 becomes equal to or greater than the threshold value D1, the catalyst temperature increase request signal is transmitted from the engine ECU 100 to the HVECU 70 in order to increase the temperature of the exhaust gas removing catalyst 180 of the upstream control apparatus 18 and the temperature of the particulate filter 190 of the downstream control apparatus 19 (Step S150 of FIG. 3). Then, in a case where the temperature increase of the particulate filter 190 and the like is permitted by the HVECU 70, while the engine 10 is in the load operation according to the depression amount of the accelerator pedal 84 by the driver, the engine ECU 100 executes the catalyst temperature increase control routine (FIGS. 4 and 5) for stopping the fuel supply to at least one cylinder 11 of the engine 10 and supplying fuel to the remaining cylinders 11. During the execution of the catalyst temperature increase control routine, the HVECU 70 executes control such that the motor generator MG2 as a power generation device supplements insufficient torque (drive power) due to the stop of the fuel supply to at least one cylinder 11 (FIGS. 6A and 6B).

With this, it is possible to supplement insufficient torque due to the stop of the fuel supply to a part of cylinders 11 from the motor generator MG2 with high accuracy and excellent responsiveness, and to output torque according to the requested torque Tr* to the wheels W during the execution of the catalyst temperature increase control routine. The HVECU 70 (and the MGECU 55) executes control such that the motor generator MG2 (electric motor) supplements insufficient torque while the fuel supply to at least one cylinder 11 is stopped (during fuel cut) (Steps S515 and S560 of FIG. 6B). With this, it is possible to extremely satisfactorily suppress deterioration of drivability of the hybrid vehicle 1 during the execution of the catalyst temperature increase control routine.

During the execution of the catalyst temperature increase control routine, the HVECU 70 sets the lower limit rotation speed Nelim of the engine 10 to be higher than in a case where the catalyst temperature increase control routine is not executed (Step S430 of FIG. 6A). With this, it is possible to reduce a time for which the fuel supply to a part of cylinders 11 is stopped, that is, a time for which torque is not output from the engine 10 due to the fuel cut. Accordingly, in the hybrid vehicle 1, it is possible to extremely satisfactorily suppress actualization of vibration or the like of the engine 10 due to the fuel cut of a part of cylinders 11.

Figure 8:
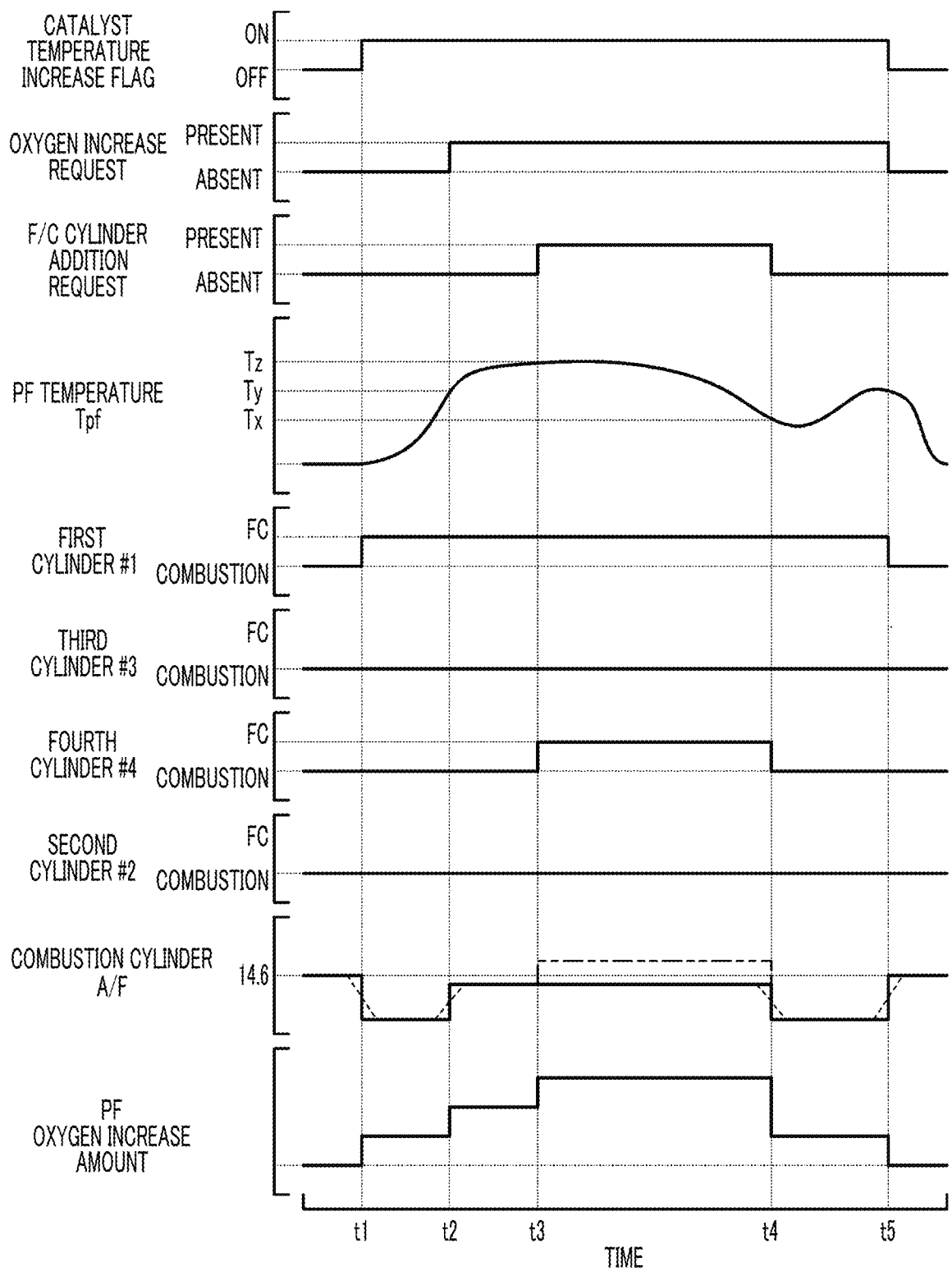
FIG. 8 is a time chart showing an operation state of the multi-cylinder engine or change in temperature of a particulate filter while the routines shown in FIGS. 4 to 6A and 6B are executed.

In a case where the execution of the catalyst temperature increase control routine is permitted by the HVECU 70 (time t1 in FIG. 8), the engine ECU 100 stops the fuel supply to one cylinder 11 (first cylinder #1) of the engine 10, and makes the air-fuel ratio in each of the remaining cylinders 11 (the second cylinder #2, the third cylinder #3, and the fourth cylinder #4) rich (Steps S230 to S270 of FIG. 4). With this, a comparatively large amount of air, that is, oxygen is introduced from the cylinder 11 (fuel cut cylinder), to which the fuel supply is stopped, into the upstream and downstream control apparatuses 18, 19, and a comparatively large amount of unburned fuel is introduced from the cylinders 11 (combustion cylinders), to which fuel is supplied, into the upstream and downstream control apparatuses 18, 19. That is, the substantially same amount of air (not gas in a lean atmosphere, but air rarely including a fuel component) as the capacity (volume) of the cylinder 11 is supplied from the fuel cut cylinder to the upstream and downstream control apparatuses 18, 19. As a result, a comparatively large amount of unburned fuel is brought into reaction in presence of a sufficient amount of oxygen during the load operation of the engine 10, and as shown in FIG. 8, it is possible to sufficiently and quickly the temperature of the exhaust gas removing catalyst 180 or the particulate filter 190, on which the exhaust gas removing catalyst is carried, with reaction heat.

While fuel is supplied such that the air-fuel ratio in each of all combustion cylinders other than the fuel cut cylinder is made rich in this way, the HVECU 70 (and the MGECU 55) executes control such that the motor generator MG1 (second electric motor) converts surplus power of the engine 10 generated by richness of the air-fuel ratio in each of the remaining cylinders 11 (combustion cylinders) into electric power (Steps S510 to S560 of FIG. 6B). With this, it is possible to suppress deterioration of fuel efficiency of the engine 10 accompanied by the execution of the catalyst temperature increase control routine without complicating the control of the motor generator MG2 for supplementing the insufficient torque.

In a case where charging of the electric power storage device 40 is restricted, and the surplus power of the engine 10 cannot be converted into electric power by the motor generator MG1, the HVECU 70 transmits the ignition retard request signal for requesting the retard of the ignition timing to the engine ECU 100 (Step S555 of FIG. 6B). Then, the engine ECU 100 that receives the ignition retard request signal retards the ignition timing in each of the combustion cylinders from the optimum ignition timing (MBT). With this, even though charging of the electric power storage device 40 with electric power generated by the motor generator MG1 is restricted, it is possible to suppress an increase in output torque of the engine 10 accompanied by richness of the air-fuel ratio in each of the combustion cylinders to satisfactorily secure drivability of the hybrid vehicle 1.

The engine ECU 100 changes the air-fuel ratio in each of all remaining cylinders 11 (combustion cylinders) to the lean side to make the air-fuel ratio slightly rich while stopping the fuel supply to the one cylinder 11 (the first cylinder #1) after the temperature Tpf of the particulate filter 190 becomes equal to or higher than the regenerative temperature Ty (first determination threshold value) (time t2 in FIG. 8) during the execution of the catalyst temperature increase control (Step S310 of FIG. 5, or the like). The engine ECU 100 stops the fuel supply to one (the fourth cylinder #4) of the remaining cylinders 11 under a condition that insufficient torque due to the execution of the catalyst temperature increase control routine can be supplemented by the motor generator MG2 (Steps S460 to S480 of FIG. 6A) after the temperature Tpf of the particulate filter 190 becomes equal to or higher than the regeneration promotion temperature Tz (second determination threshold value) higher than the regenerative temperature Ty (time t3 in FIG. 8) during the execution of the catalyst temperature increase control (Step S305 of FIG. 5, or the like).

With this, it is possible to supply a greater amount of oxygen from a plurality of fuel cut cylinders into the upstream and downstream control apparatuses 18, 19, which are sufficiently increased in temperature, while stably operating the engine 10, in which the fuel supply to a part of cylinders 11 is stopped. Accordingly, in the hybrid vehicle 1, it is possible to introduce a greater amount of oxygen from the fuel cut cylinders into the particulate filter 190, which is increased in temperature along with the exhaust gas removing catalyst, to satisfactorily combust the particulate matters deposited on the particulate filter 190. In the hybrid vehicle 1, it is also possible to satisfactorily reduce S poisoning or HC poisoning of the exhaust gas removing catalyst 180 of the upstream control apparatus 18.

In a case where the addition of the fuel cut cylinder is permitted by the HVECU 70, the engine ECU 100 selects, as a new fuel cut cylinder, the cylinder 11 (the fourth cylinder #4) to which the fuel injection (ignition) is not executed successively with respect to the one cylinder 11 (the first cylinder #1) when the catalyst temperature increase control routine is not executed. That is, in a case where fuel supply to two (a plurality of) cylinders 11 should be stopped, the engine ECU 100 executes the catalyst temperature increase control routine such that fuel is supplied to at least one cylinder 11 after the fuel supply to one cylinder 11 is stopped. With this, since the fuel supply to a plurality of cylinders 11 is not stopped successively, it is possible to suppress fluctuation of torque or deterioration of engine sound output from the engine 10.

In a case where the temperature Tpf of the particulate filter 190 becomes lower than the temperature increase control start temperature Tx after the fuel cut cylinder is added (time t4 in FIG. 8), as shown in FIG. 8, the engine ECU 100 decreases the number of fuel cut cylinders and makes the air-fuel ratio in each of the cylinders 11 (combustion cylinders), to which fuel is supplied, rich (Step S325 of FIG. 5, and Steps S220 to S270 of FIG. 4). With this, in a case where both of the upstream and downstream control apparatuses 18, 19 are reduced in temperature according to an increase in air introduction amount into the upstream and downstream control apparatuses 18, 19 accompanied by the addition of the fuel cut cylinder, it is possible to make the air-fuel ratio in each of the combustion cylinders rich to increase the temperatures of the upstream and downstream control apparatuses 18, 19 again, and to decrease the amount of air introduced into the upstream and downstream control apparatuses 18, 19 with a decrease in the number of fuel cut cylinders to suppress a temperature reduction of both of the upstream and downstream control apparatuses 18, 19.

Then, in a case where the deposition amount Dpm in the particulate filter 190 becomes equal to or less than the threshold value D0 (time t5 in FIG. 8), the engine ECU 100 turns off the catalyst temperature increase flag and ends the catalyst temperature increase control routine. Note that, in a case where a duration of an accelerator ON state is comparatively short, and in the interim, the deposition amount Dpm in the particulate filter 190 does not become equal to or less than the threshold value D0, the routines of FIGS. 4 to 6A and 6B are interrupted, and are restarted when the accelerator pedal 84 is next depressed by the driver.

As described above, in the hybrid vehicle 1, it is possible to sufficiently and quickly increase the temperatures of the upstream and downstream control apparatuses 18, 19 and to supply a sufficient amount of oxygen for the generation of the exhaust gas removing catalyst 180 or the particulate filter 190 to the upstream and downstream control apparatuses 18, 19 while suppressing deterioration of drivability during the load operation of the engine 10. That is, with the above-described catalyst temperature increase control routine, even in a low-temperature environment that a large amount of particulate matters tends to be deposited on the particulate filter 190, in particular, even in an extremely low-temperature environment that a daily average air temperature falls below −20° C., it is possible to satisfactorily combust the particulate matters deposited on the particulate filter 190 to regenerate the particulate filter 190.

In the above-described embodiment, although the air-fuel ratio in each of all combustion cylinders other than the fuel cut cylinder is made rich in a case where the execution of the catalyst temperature increase control routine is permitted, an applicable embodiment of the present disclosure is not limited thereto. That is, in the hybrid vehicle 1, the engine ECU 100 may set the air-fuel ratio in each of the combustion cylinders to the stoichiometric air-fuel ratio instead of making the air-fuel ratio in each of the combustion cylinders rich at the beginning of the start of the catalyst temperature increase control routine. In such an aspect, while a time is needed for increasing the temperatures of the upstream and downstream control apparatuses 18, 19 compared to a case where the air-fuel ratio in each of the combustion cylinders is made rich, it is possible to bring unburned fuel into reaction in presence of a sufficient amount of oxygen to sufficiently increase the temperatures of the upstream and downstream control apparatuses 18, 19 with reaction heat.

The fuel supply to a part of cylinders 11 is stopped successively, whereby it is possible to supply a sufficient amount of oxygen into the upstream and downstream control apparatuses 18, 19, which are increased in temperature.

In the above-described embodiment, although the air-fuel ratio in each of all combustion cylinders is changed to the lean side after the temperature Tpf of the particulate filter 190 becomes equal to or higher than the regenerative temperature Ty (first determination threshold value), an applicable embodiment of the present disclosure is not limited thereto. That is, in the hybrid vehicle 1, the air-fuel ratio in each of the remaining cylinders 11 other than the fuel cut cylinder may be made rich until the temperature Tpf of the particulate filter 190 reaches the regeneration promotion temperature Tz (determination threshold value). Then, the fuel supply to one of the remaining cylinders 11 may be stopped and the air-fuel ratio in the cylinder 11, to which the fuel supply is not stopped, among the remaining cylinders 11 may be changed to lean side (slightly rich) under a condition that the insufficient torque can be supplemented by the motor generator MG2 after the temperature Tpf becomes equal to or higher than the regeneration promotion temperature Tz. According to such an aspect, it is possible to supply a greater amount of oxygen into the upstream and downstream control apparatuses 18, 19 after sufficiently and quickly increasing the temperature of the exhaust gas removing catalyst 180 or the particulate filter 190.

In Step S310 of FIG. 5, the fuel injection amount may be set such that the air-fuel ratio in each of all combustion cylinders other than the fuel cut cylinder is made lean. After the temperature Tpf of the particulate filter 190 becomes equal to or higher than the regeneration promotion temperature Tz, as indicated by a two-dot-chain line in FIG. 8, the engine ECU 100 may make the air-fuel ratio in each of all combustion cylinders other than the fuel cut cylinder lean instead of adding a fuel cut cylinder. When the air-fuel ratio in each of the combustion cylinder should be changed during the execution of the catalyst temperature increase control routine, as indicated by a broken line in FIG. 8, for example, the air-fuel ratio in each of the combustion cylinder may be gradually changed according to change in the temperature Tpf of the particulate filter 190, or the like.

In the hybrid vehicle 1, the surplus power of the engine 10 generated by richness of the air-fuel ratio in each of the combustion cylinders may be converted into electric power by the motor generator MG2 instead of the motor generator MG1. In this case, in Step S540 of FIG. 6B, determination is made whether or not the electric power storage device 40 can be charged with electric power generated by the motor generator MG2 in a case where the excess torque Tex is cancelled by the motor generator MG2. In Step S550 of FIG. 6B, torque corresponding to the excess torque Tex is subtracted from the torque command Tm2* set in Step S450 to reset the torque command Tm2*. Then, in Step S560, the torque command Tm1* set in Step S450 and the torque command Tm2* reset in the Step S550 are transmitted to the MGECU 55. Then, in a case where determination is made in Step S520 of FIG. 6B that the richness flag Fr is the value 1, the ignition retard request signal may be transmitted to the engine ECU 100. With the aspects, when the air-fuel ratio in each of the combustion cylinder is made rich during the execution of the catalyst temperature increase control routine, it is possible to output torque according to the requested torque Tr* to the wheels W to satisfactorily secure drivability of the hybrid vehicle 1.

Although the engine 10 of the hybrid vehicle 1 is an in-line engine, and the catalyst temperature increase control routine is constructed to stop the fuel supply to at least one cylinder 11 is stopped during one cycle, an applicable embodiment of the present disclosure is not limited thereto. That is, the engine 10 of the hybrid vehicle 1 may be a V-shaped engine, a horizontal opposed engine, or a W-shaped engine in which an exhaust gas control apparatus is provided for each bank. In this case, the catalyst temperature increase control routine may be constructed such that fuel supply to at least one cylinder in each bank is stopped during one cycle. With this, it is possible to send a sufficient amount of oxygen to the exhaust gas control apparatus in each bank of the V-shaped engine or the like.

The downstream control apparatus 19 may include an exhaust gas removing catalyst (three-way catalyst) disposed on an upstream side, and a particulate filter disposed downstream of the exhaust gas removing catalyst. In this case, the hybrid vehicle 1 to the upstream control apparatus 18 may be omitted. The downstream control apparatus 19 may include solely the particulate filter. In this case, the exhaust gas removing catalyst of the upstream control apparatus 18 is increased in temperature with the execution of the catalyst temperature increase control routine, whereby it is possible to increase the temperature of the downstream control apparatus 19 (the particulate filter 190) with high-temperature exhaust gas flowing from the upstream control apparatus 18.

In the hybrid vehicle 1, the motor generator MG1 may be coupled to the sun gear 31 of the planetary gear 30, the output member may be coupled to the ring gear 32, and the engine 10 and the motor generator MG2 may be coupled to the planetary carrier 34. A stepped transmission may be coupled to the ring gear 32 of the planetary gear 30. In the hybrid vehicle 1, the planetary gear 30 may be replaced with a four-element compound planetary gear mechanism including two planetary gears. In this case, the engine 10 may be coupled to an input element of the compound planetary gear mechanism, the output member may be coupled to an output element, the motor generator MG1 may be coupled to one of remaining two rotating elements, and the motor generator MG2 may be coupled to the other rotating element. The compound planetary gear mechanism may be provided with a clutch that couples two of the four rotating elements or a brake that can unrotatably fix one rotating element. The hybrid vehicle 1 may be constituted as a plug-in hybrid vehicle that can charge the electric power storage device 40 with electric power from an external power supply, such as a household power supply or a rapid charger provided in a stand.

Figure 9:
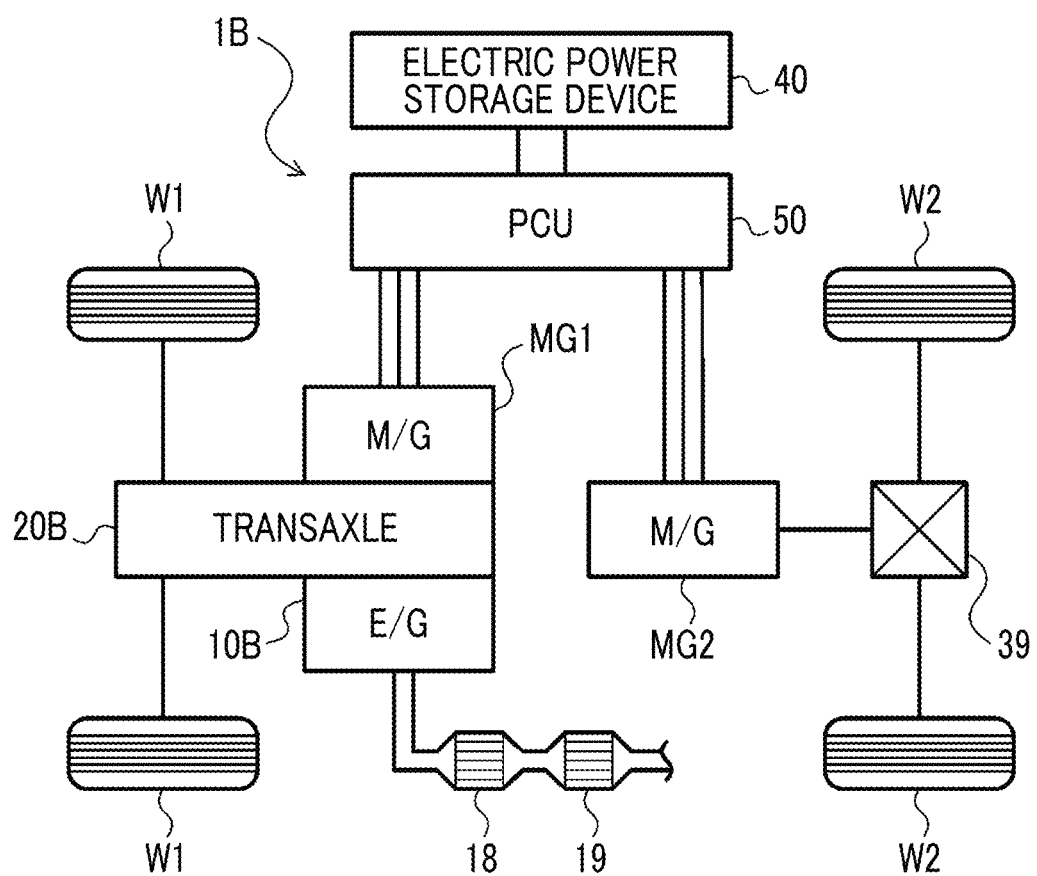
FIG. 9 is a schematic configuration diagram showing another hybrid vehicle of the present disclosure.

FIG. 9 is a schematic configuration diagram showing another hybrid vehicle 1B of the present disclosure. Among the components of the hybrid vehicle 1B, the same components as those of the hybrid vehicle 1 described above are represented by the same reference numerals, and overlapping description will not be repeated.

The hybrid vehicle 1B shown in FIG. 9 is a series-parallel hybrid vehicle including an engine (internal combustion engine) 10B including a plurality of cylinders (not shown), motor generators (synchronous motor generators) MG1, MG2, and a transaxle 20B. The engine 10B includes an upstream control apparatus 18 and a downstream control apparatus 19 as an exhaust gas control apparatus. A crankshaft (not shown) of the engine 10B, a rotor of the motor generator MG1, and wheels W1 are coupled to a transaxle 20B. The motor generator MG2 is coupled to wheels W2 different to the wheels W1. Note that the motor generator MG2 may be coupled to the wheels W1. The transaxle 20B may include a stepped transmission, a continuously variable transmission, a dual-clutch transmission, or the like.

The hybrid vehicle 1B can travel with drive torque (drive power) from at least one of the motor generators MG1, MG2 that are driven with electric power from the electric power storage device 40 when the operation of the engine 10B is stopped. In the hybrid vehicle 1B, the whole power from the engine 10B in the load operation can be converted into electric power by the motor generator MG1, and the motor generator MG2 can be driven with electric power from the motor generator MG1. In the hybrid vehicle 1B, drive torque (drive power) from the engine 10B in the load operation can be transmitted to the wheels W1 through the transaxle 20B.

In the hybrid vehicle 1B, while the drive torque from the engine 10B in the load operation is transmitted to the wheels W1 through the transaxle 20B, the same catalyst temperature increase control routine as shown in FIGS. 4 and 5 is executed by the engine ECU (not shown). While the catalyst temperature increase control routine is executed, control is executed such that the motor generator MG2 supplements insufficient drive torque due to the fuel cut of a part of cylinders of the engine 10B. With this, in the hybrid vehicle 1B, it is possible to obtain the same advantageous effects as the hybrid vehicle 1. In the hybrid vehicle 1B, during the execution of the catalyst temperature increase control routine, a down-shift (change of a gear ratio) of a transmission included in the transaxle 20B may be appropriately executed to make the rotation speed of the engine 10B be equal to or higher than a predetermined rotation speed. With this, it is possible to increase the rotation speed of the engine 10B to reduce a time for which the fuel supply to a part of cylinders is stopped, and to extremely satisfactorily suppress actualization of vibration of the like of the engine 10B.

Figure 10:
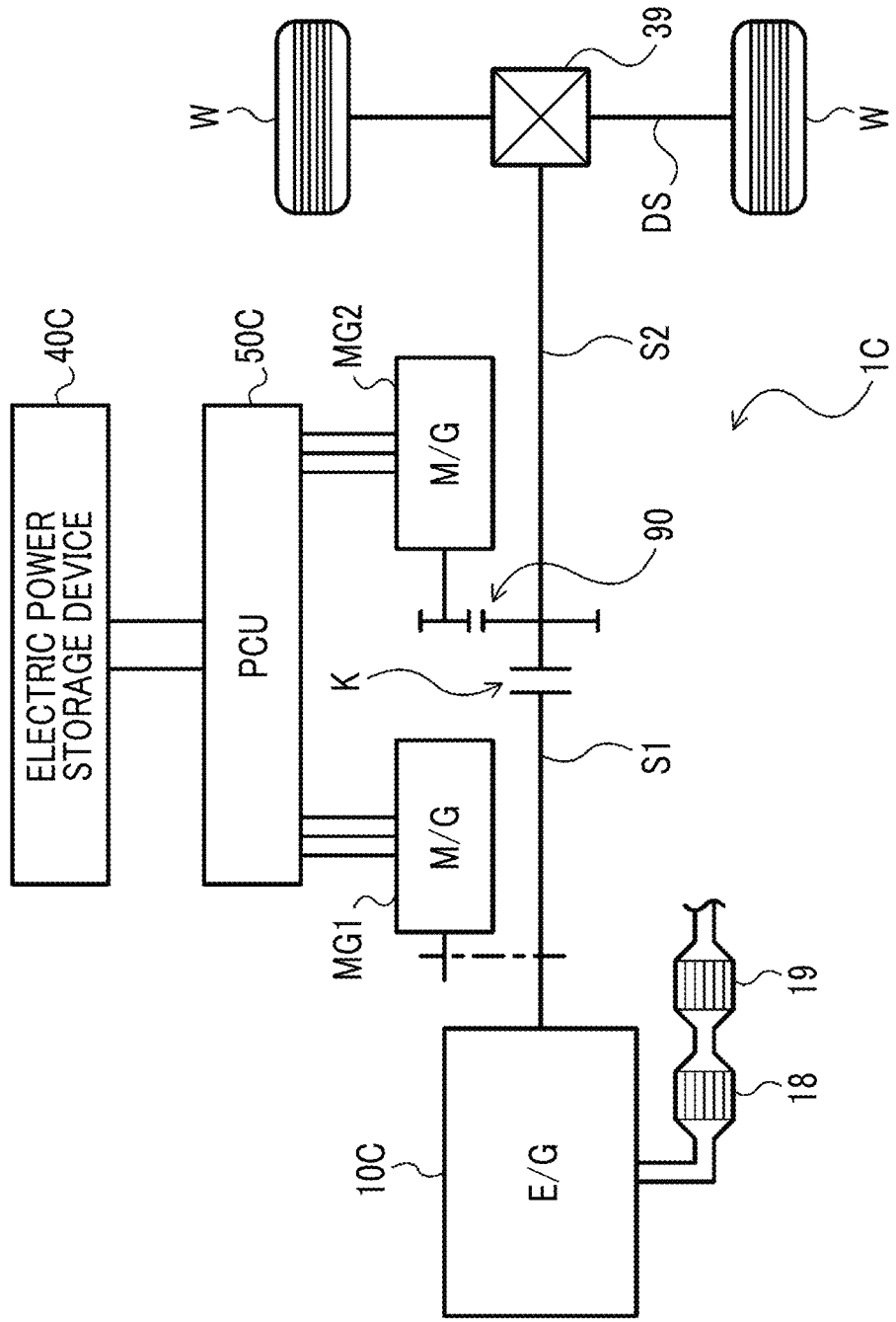
FIG. 10 is a schematic configuration diagram showing still another hybrid vehicle of the present disclosure.

FIG. 10 is a schematic configuration diagram showing still another hybrid vehicle 1C of the present disclosure. Among the components of the hybrid vehicle 1C, the same components as those of the hybrid vehicle 1 and the like described above are represented by the same reference numerals, and overlapping description will not be repeated.

The hybrid vehicle 1C shown in FIG. 10 is a series-parallel hybrid vehicle including an engine (internal combustion engine) 10C including a plurality of cylinders (not shown), and motor generators (synchronous motor generators) MG1, MG2. In the hybrid vehicle 1C, a crankshaft of the engine 10C and a rotor of the motor generator MG1 are coupled to a first shaft S1, and the motor generator MG1 can convert at least a part of power from the engine 10C into electric power. A rotor of the motor generator MG2 is coupled to a second shaft S2 directly or through a power transmission mechanism 120 including a gear train and the like, and the second shaft S2 is coupled to the wheels W through the differential gear 39 and the like. Note that the motor generator MG2 may be coupled to wheels (not shown) other than the wheels W. The hybrid vehicle 1C includes a clutch K that connects the first shaft S1 and the second shaft S2 to each other and disconnects both shafts. In the hybrid vehicle 1C, the power transmission mechanism 120, the clutch K, and the differential gear 39 may be included in a transaxle.

In the hybrid vehicle 1C, it is possible to output drive torque from the engine 10C to the second shaft S2, that is, the wheels W when the clutch K is engaged. Then, in the hybrid vehicle 1C, while the crankshaft of the engine 10C and the second shaft S2, that is, the wheels W are coupled by the clutch K, and the engine 10C is in the load operation according to depression of the accelerator pedal by the driver, the same catalyst temperature increase control routine as shown in FIGS. 4 and 5 is executed by the engine ECU (not shown). While the catalyst temperature increase control routine is executed, control is executed such that the motor generator MG2 supplements insufficient drive torque due to the fuel cut of a part of cylinders of the engine 10C. With this, in the hybrid vehicle 1C, it is possible to obtain the same advantageous effects as the hybrid vehicle 1 and the like.

Figure 11:
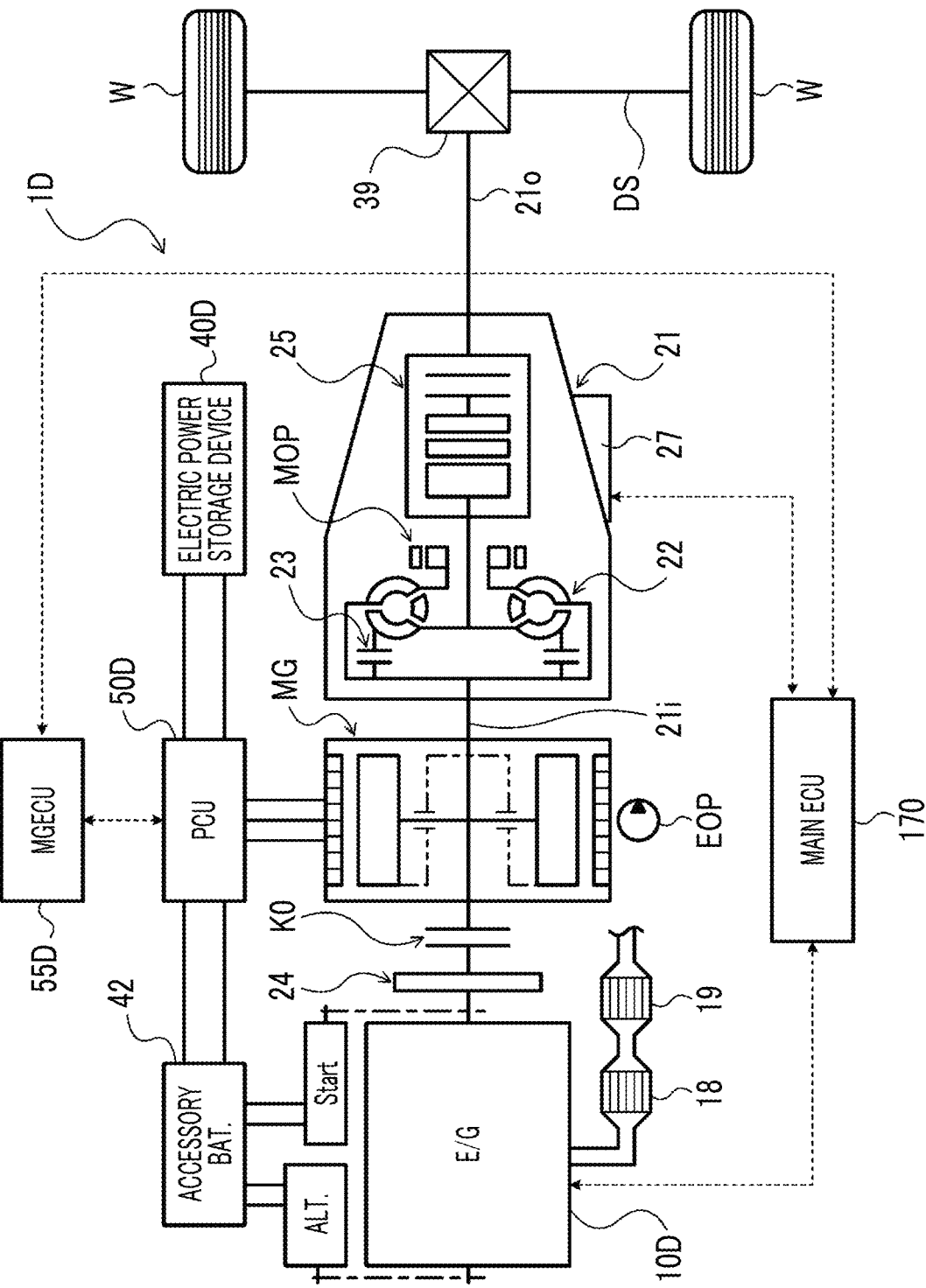
FIG. 11 is a schematic configuration diagram showing still another hybrid vehicle of the present disclosure.

FIG. 11 is a schematic configuration diagram showing still another hybrid vehicle 1D of the present disclosure. Among the components of the hybrid vehicle 1D, the same components as those of the hybrid vehicle 1 and the like described above are represented by the same reference numerals, and overlapping description will not be repeated.

The hybrid vehicle 1D shown in FIG. 11 is a parallel hybrid vehicle including an engine (internal combustion engine) 10D including a plurality of cylinders (not shown), a motor generator (synchronous motor generator) MG, a hydraulic clutch K0, a power transmission device 21, an electric power storage device (high-voltage battery) 40D, an accessory battery (low-voltage battery) 41, a PCU 50D that drives the motor generator MG, an MGECU 55D that controls the PCU 50D, and a main electronic control unit (hereinafter, referred to as "main ECU") 170 that controls the engine 10D and the power transmission device 21. The engine 10D includes an upstream control apparatus 18 and a downstream control apparatus 19 as an exhaust gas control apparatus, and a crankshaft of the engine 10D is coupled to an input member of a damper mechanism 24. The motor generator MG operates as an electric motor that is driven with electric power from the electric power storage device 40D to generate drive torque, and outputs regenerative braking torque at the time of braking of the hybrid vehicle 1D. The motor generator MG also operates a power generator that converts at least a part of power from the engine 10D in a load operation into electric power. As shown in the drawing, a rotor of the motor generator MG is fixed to an input shaft 21i of the power transmission device 21.

The clutch K0 couples an output member of the damper mechanism 24, that is, the crankshaft of the engine 10D and the input shaft 21i, that is, the rotor of the motor generator MG, and decouples both of the output member of the damper mechanism 24 and the input shaft 21i. The power transmission device 21 includes a torque converter (fluid-operated power transmission device) 22, a multi-plate or single-plate lockup clutch 23, a mechanical oil pump MOP, an electric oil pump EOP, a transmission 25, a hydraulic control device 27 that controls pressure of hydraulic oil, and the like. The transmission 25 is, for example, a four-speed to ten-speed gear shift type automatic transmission, and includes a plurality of planetary gear and a plurality of clutches and brakes (frictional engagement elements). The transmission 25 outputs power transmitted from the input shaft 21i through either of the torque converter 22 or the lockup clutch 23 from an output shaft 210 of the power transmission device 21 to a drive shaft DS through the differential gear 39 with a gear shift in a plurality of stages. Note that the transmission 25 may be a mechanical continuously variable transmission, a dual-clutch transmission, or the like. A clutch may be disposed between the rotor of the motor generator MG and the input shaft 21i of the power transmission device 21 to couple or decouple both of rotor of the motor generator MG and the input shaft 21i of the power transmission device 21 (see a two-dot-chain line in FIG. 11).

In the hybrid vehicle 1D, while the crankshaft of the engine 10D and the input shaft 21i, that is, the motor generator MG are coupled by the clutch K0, and the engine 10D is in the load operation according to depression of the accelerator pedal by the driver, the same catalyst temperature increase control routine as shown in FIGS. 4 and 5 is executed by the main ECU 170. While the catalyst temperature increase control routine is executed, the main ECU 170 and the MGECU 55D execute control such that the motor generator MG supplements insufficient drive torque due to the fuel cut of a part of cylinders of the engine 10D. With this, in the hybrid vehicle 1D, it is possible to obtain the same advantageous effects as the hybrid vehicle 1 and the like. In the hybrid vehicle 1D, when the air-fuel ratio in each of the combustion cylinders is made rich, surplus power of the engine 10D may be converted into electric power by the motor generator MG, or an increase in output torque of the engine 10D may be suppressed by the retard of the ignition timing. In the hybrid vehicle 1D, during the execution of the catalyst temperature increase control routine, a down-shift (change of a gear ratio) of the transmission 25 may be appropriately executed to make the rotation speed of the engine 10D be equal to or higher than a predetermined rotation speed.

Figure 12:
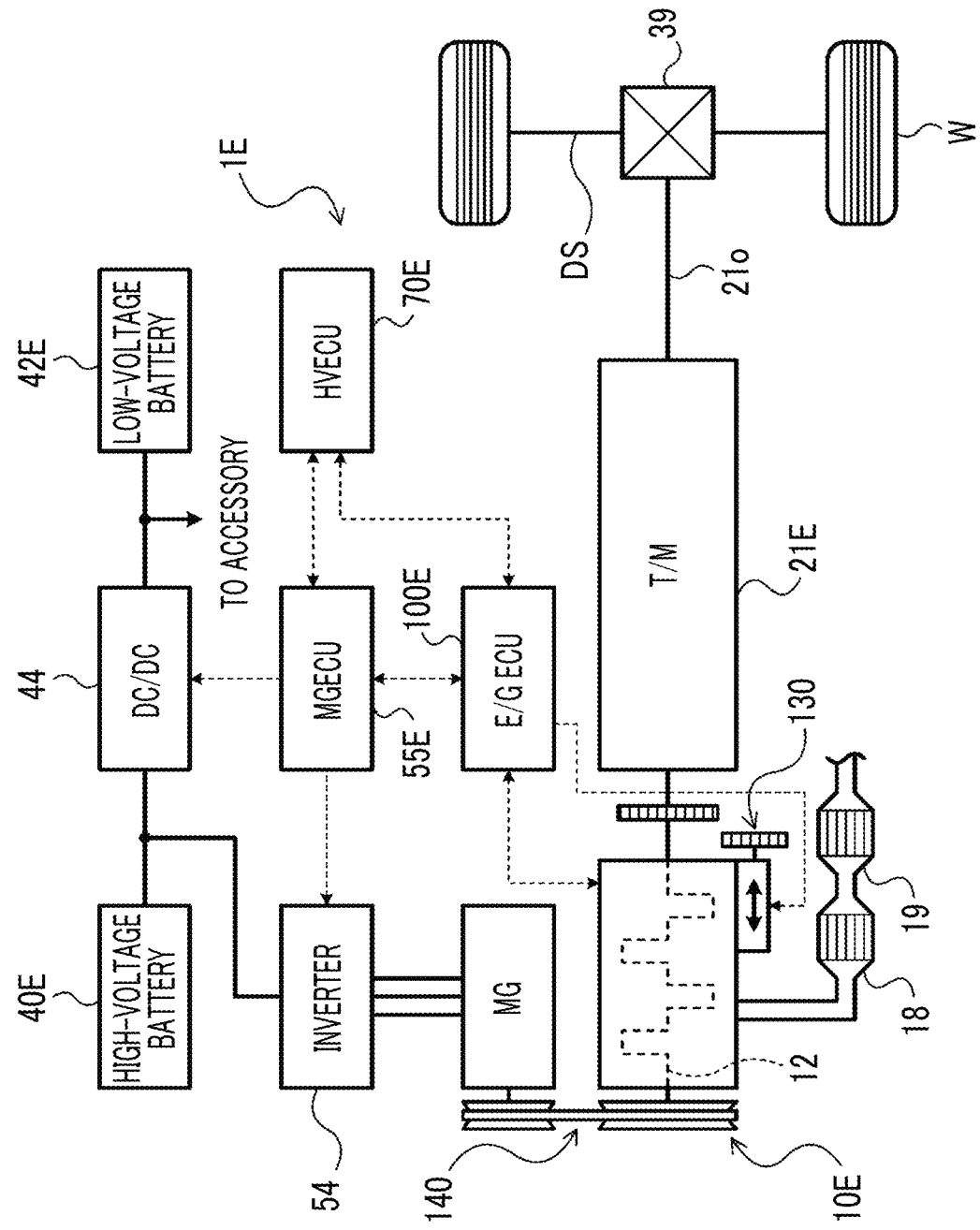
FIG. 12 is a schematic configuration diagram showing still another hybrid vehicle of the present disclosure.

FIG. 12 is a schematic configuration diagram showing still another hybrid vehicle 1E of the present disclosure. Among the components of the hybrid vehicle 1E, the same components as those of the hybrid vehicle 1 and the like described above are represented by the same reference numerals, and overlapping description will not be repeated.

The hybrid vehicle 1E shown in FIG. 12 includes an engine (internal combustion engine) 10E including a plurality of cylinders (not shown), a motor generator (synchronous motor generator) MG, a power transmission device 21E, a high-voltage battery 40E, a low-voltage battery (accessory battery) 41E, a DC/DC converter 44 connected to the high-voltage battery 40E and the low-voltage battery 41E, an inverter 54 that drives the motor generator MG, an engine ECU 100E that controls the engine 10E, an MGECU 55E that controls the DC/DC converter 44 and the inverter 54, and an HVECU 70E that controls the entire vehicle. The engine 10E includes an upstream control apparatus 18 and a downstream control apparatus 19 as an exhaust gas control apparatus, and a crankshaft 12 of the engine 10E is coupled to an input member of a damper mechanism (not shown) included in the power transmission device 21E. The engine 10E includes a starter 130 that output cranking torque to the crankshaft 12 to start the engine 10E.

A rotor of the motor generator MG is coupled to an end portion of the crankshaft 12 of the engine 10E on an opposite side to the power transmission device 21E through a power transmission mechanism 140. In the embodiment, the power transmission mechanism 140 is a winding power transmission mechanism, a gear mechanism, or a chain mechanism. Note that the motor generator MG may be disposed between the engine 10E and the power transmission device 21E or may be a direct-current electric motor. The power transmission device 21E includes, in addition to the damper mechanism, a torque converter (fluid-operated power transmission device), a multi-plate or single-plate lockup clutch, a transmission, a hydraulic control device that controls pressure of hydraulic oil, and the like. The transmission of the power transmission device 21E is a stepped transmission, a mechanical continuously variable transmission, a dual-clutch transmission, or the like.

In the hybrid vehicle 1E, cranking torque is output from the motor generator MG to the crankshaft 12 through the power transmission mechanism 140, whereby the engine 10E can be started. During traveling of the hybrid vehicle 1E, the motor generator MG primarily operates as a power generator that converts a part of power from the engine 10E in the load operation into electric power, and is appropriately driven with electric power from the high-voltage battery 40E to output drive torque (assist torque) to the crankshaft 12 of the engine 10E. At the time of braking of the hybrid vehicle 1E, the motor generator MG outputs regenerative braking torque to the crankshaft 12 of the engine 10E.

In the hybrid vehicle 1E, while the engine 10E is in the load operation according to depression of the accelerator pedal by the driver, the same catalyst temperature increase control routine as shown in FIGS. 4 and 5 is executed by the engine ECU 100E. While the catalyst temperature increase control routine is executed, the HVECU 70E and the MGECU 55E execute control such that the motor generator MG supplements insufficient drive torque due to the fuel cut of a part of cylinders of the engine 10E. With this, in the hybrid vehicle 1E, it is possible to obtain the same advantageous effects as the hybrid vehicle 1 and the like. In the hybrid vehicle 1E, when the air-fuel ratio in each of the combustion cylinders is made rich, surplus power of the engine 10E may be converted into electric power by the motor generator MG, or an increase in the output torque of the engine 10E may be suppressed by the retard of the ignition timing. In the hybrid vehicle 1E, during the execution of the catalyst temperature increase control routine, a down-shift (change of a gear ratio) of the transmission of the power transmission device 21E may be appropriately executed to make the rotation speed of the engine 10E be equal to or higher than a predetermined rotation speed.

As described above, the present disclosure provides a hybrid vehicle. The hybrid vehicle includes a multi-cylinder engine, an exhaust gas control apparatus, an electric motor, and an electric power storage device. The exhaust gas control apparatus includes a catalyst. The catalyst is configured to remove exhaust gas from the multi-cylinder engine. The electric power storage device is configured to exchange electric power with the electric motor. At least one of the multi-cylinder engine and the electric motor outputs drive power to wheels. The hybrid vehicle further includes a control device. The control device is configured to execute catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine, execute control such that the electric motor supplements insufficient drive power due to the execution of the catalyst temperature increase control, and change the air-fuel ratio in at least one of the remaining cylinders to a lean side after a temperature of the exhaust gas control apparatus becomes equal to or higher than a determination threshold value determined in advance during the execution of the catalyst temperature increase control.

The control device of the hybrid vehicle of the present disclosure is configured to execute the catalyst temperature increase control multi-cylinder engine for stopping the fuel supply to the at least one cylinder and making the air-fuel ratio in each of the remaining cylinders rich in a case where the temperature increase of the catalyst is requested during the load operation of the multi-cylinder engine. With this, during the execution of the catalyst temperature increase control, a comparatively large amount of air, that is, oxygen is introduced from the cylinder, to which the fuel supply is stopped, into the exhaust gas control apparatus, and a comparatively large amount of unburned fuel is introduced from the cylinders, to which fuel is supplied, into the exhaust gas control apparatus. As a result, it is possible to bring a comparatively large amount of unburned fuel into reaction in presence of a sufficient amount of oxygen to sufficiently and quickly increase the temperature of the catalyst with reaction heat during the load operation of the multi-cylinder engine. The control device is configured to change the air-fuel ratio in at least one of the remaining cylinders to the lean side while stopping the fuel supply to the at least one cylinder in a case where the temperature of the exhaust gas control apparatus becomes equal to or higher than the determination threshold value determined in advance. With this, it is possible to supply a large amount of oxygen into the exhaust gas control apparatus, which is increased in temperature. Then, the control device is configured to execute control such that the electric motor supplements insufficient drive power due to the catalyst temperature increase control, that is, the stop of the fuel supply to the at least one cylinder during the execution of the catalyst temperature increase control. With this, it is possible to supplement insufficient drive power due to the stop of the fuel supply to a part of cylinders from the electric motor with high accuracy and excellent responsiveness during the execution of the catalyst temperature increase control, and to output drive power according to the request to the wheels. Accordingly, in the hybrid vehicle of the present disclosure, it is possible to sufficiently and quickly increase the temperature of the catalyst of the exhaust gas control apparatus and to supply a sufficient amount of oxygen to the exhaust gas control apparatus while suppressing deterioration of drivability during the load operation of the multi-cylinder engine.

The control device may be configured to change the air-fuel ratio in each of the remaining cylinders to a lean side after the temperature of the exhaust gas control apparatus becomes equal to or higher than a first determination threshold value during the execution of the catalyst temperature increase control, and stop fuel supply to the at least one of the remaining cylinders under a condition that the insufficient drive power due to the execution of the catalyst temperature increase control is able to be supplemented by the electric motor after the temperature of the exhaust gas control apparatus becomes equal to or higher than a second determination threshold value higher than the first determination threshold value. With this, it is possible to supply a greater amount of oxygen into the exhaust gas control apparatus, which is sufficiently increased in temperature, while stably operating the multi-cylinder engine in which the fuel supply to a part of cylinders is stopped.

The control device may be configured to stop fuel supply to at least one of the remaining cylinders and change the air-fuel ratio in each of the cylinders, to which the fuel supply is not stopped, among the remaining cylinders to a lean side under a condition that the insufficient drive power due to the execution of the catalyst temperature increase control is able to be supplemented by the electric motor after the temperature of the exhaust gas control apparatus becomes equal to or higher than the determination threshold value during the execution of the catalyst temperature increase control. With this, it is possible to supply a large amount of oxygen into the exhaust gas control apparatus after sufficiently and quickly increasing the temperature of the catalyst.

The control device may be configured to make the air-fuel ratio in each of the cylinders, to which fuel is supplied, rich in a case where the temperature of the exhaust gas control apparatus becomes lower than a predetermined temperature after the air-fuel ratio in the at least one of the remaining cylinders is changed to the lean side. With this, in a case where the temperature of the exhaust gas control apparatus is reduced with an increase in the amount of air introduced into the exhaust gas control apparatus, it is possible to make the air-fuel ratio in each of the cylinders, to which fuel is supplied, rich to increase the temperature of the exhaust gas control apparatus again.

The control device may be configured to reduce the number of cylinders, to which the fuel supply is stopped, in a case where the temperature of the exhaust gas control apparatus becomes lower than the predetermined temperature after the air-fuel ratio in the at least one of the remaining cylinders is changed to the lean side. With this, it is possible to decrease the amount of air introduced into the exhaust gas control apparatus to suppress a temperature reduction of the exhaust gas control apparatus.

The control device may be configured to execute the catalyst temperature increase control to supply fuel at least one cylinder after the fuel supply to any one of the cylinders is stopped. With this, since the fuel supply to a plurality of cylinders is not stopped successively, it is possible to suppress fluctuation of torque output from the multi-cylinder engine or deterioration of engine sound.

The exhaust gas control apparatus may include a particulate filter. In a vehicle that includes such an exhaust gas control apparatus, it is possible to introduce a large amount of oxygen from the cylinder, to which the fuel supply is stopped, into the particulate filter, which is increased in temperature along with the catalyst to satisfactorily combust the particulate matters deposited on the particulate filter. That is, the catalyst temperature increase control of the present disclosure is extremely useful in regenerating the particulate filter in a low-temperature environment that a large amount of particulate matters tends to be deposited on the particulate filter. Then, the particulate filter may be disposed downstream of the catalyst or may carry the catalyst. The exhaust gas control apparatus may include an upstream control apparatus that includes the catalyst, and a downstream control apparatus that includes at least the particulate filter and is disposed downstream of the upstream control apparatus.

The present disclosure also provides a control method for a hybrid vehicle. The hybrid vehicle includes a multi-cylinder engine, an exhaust gas control apparatus, an electric motor, and an electric power storage device. The exhaust gas control apparatus includes a catalyst. The catalyst is configured to remove exhaust gas from the multi-cylinder engine. The electric power storage device is configured to exchange electric power with the electric motor. At least one of the multi-cylinder engine and the electric motor outputs drive power to wheels. The control method includes executing catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine, executing control such that the electric motor supplements insufficient drive power due to the execution of the catalyst temperature increase control, and changing the air-fuel ratio in at least one of the remaining cylinders to a lean side after a temperature of the exhaust gas control apparatus becomes equal to or higher than a determination threshold value determined in advance during the execution of the catalyst temperature increase control.

With such a method, it is possible to sufficiently and quickly increase the temperature of the catalyst of the exhaust gas control apparatus and to supply a sufficient amount of oxygen to the exhaust gas control apparatus while suppressing deterioration of drivability during the load operation of the multi-cylinder engine.

An applicable embodiment of the present disclosure is not limited to the above-described embodiment, and various alterations may be of course made within the scope of the extension of the present disclosure. The above-described embodiment is merely a specific form of the present disclosure described in SUMMARY, and does not limit the components of the present disclosure described in SUMMARY.

The present disclosure is usable in a manufacturing industry of a hybrid vehicle, or the like.

What is claimed is:

1. A hybrid vehicle comprising:
a multi-cylinder engine;
an exhaust gas control apparatus including a catalyst removing exhaust gas from the multi-cylinder engine;
an electric motor; and
an electric power storage device configured to exchange electric power with the electric motor, wherein:
the hybrid vehicle is configured such that at least one of the multi-cylinder engine and the electric motor outputs drive power to wheels; and
the hybrid vehicle further includes
a control device configured to:
  execute catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine,
  execute control such that the electric motor supplements insufficient drive power due to the execution of the catalyst temperature increase control,
  change the air-fuel ratio in at least one of the remaining cylinders to a lean side, which is higher than a stoichiometric air-fuel ratio, after a temperature of the exhaust gas control apparatus becomes equal to or higher than a determination threshold value determined in advance during the execution of the catalyst temperature increase control, and
  maintain the air-fuel ratio at the stoichiometric air-fuel ratio prior to and after the catalyst temperature increase control.

2. The hybrid vehicle according to claim 1, wherein the control device is configured to change the air-fuel ratio in each of the remaining cylinders to a lean side after the temperature of the exhaust gas control apparatus becomes equal to or higher than a first determination threshold value during the execution of the catalyst temperature increase control, and stop fuel supply to at least one of the remaining cylinders under a condition that the insufficient drive power due to the execution of the catalyst temperature increase control is able to be supplemented by the electric motor after the temperature of the exhaust gas control apparatus becomes equal to or higher than a second determination threshold value higher than the determination threshold value.

3. The hybrid vehicle according to claim 1, wherein the control device is configured to stop fuel supply to at least one of the remaining cylinders and change the air-fuel ratio in each of the cylinders, to which the fuel supply is not stopped, among the remaining cylinders to a lean side under a condition that the insufficient drive power due to the execution of the catalyst temperature increase control is able to be supplemented by the electric motor after the temperature of the exhaust gas control apparatus becomes equal to or higher than the determination threshold value during the execution of the catalyst temperature increase control.

4. The hybrid vehicle according to claim 2, wherein the control device is configured to make the air-fuel ratio in each of the cylinders, to which fuel is supplied, rich in a case where the temperature of the exhaust gas control apparatus becomes lower than the determination threshold after the air-fuel ratio in the at least one of the remaining cylinders is changed to the lean side.

5. The hybrid vehicle according to claim 4, wherein the control device is configured to reduce the number of cylinders, to which the fuel supply is stopped, in a case where the temperature of the exhaust gas control apparatus becomes lower than the determination threshold after the air-fuel ratio in the at least one of the remaining cylinders is changed to the lean side.

6. The hybrid vehicle according to claim 2, wherein the control device is configured to execute the catalyst temperature increase control to supply fuel to at least one cylinder after the fuel supply to any one of the cylinders is stopped.

7. The hybrid vehicle according to claim 1, wherein the exhaust gas control apparatus includes a particulate filter.

8. A control method for a hybrid vehicle, the hybrid vehicle including a multi-cylinder engine, an exhaust gas control apparatus including a catalyst for removing exhaust gas from the multi-cylinder engine, an electric motor, and an electric power storage device configured to exchange electric power with the electric motor, and configured such that at least one of the multi-cylinder engine and the electric motor outputs drive power to wheels, the control method comprising:
  executing catalyst temperature increase control for stopping fuel supply to at least one cylinder and making an air-fuel ratio in each of remaining cylinders other than the at least one cylinder rich in a case where a temperature increase of the catalyst is requested during a load operation of the multi-cylinder engine;
  executing control such that the electric motor supplements insufficient drive power due to the execution of the catalyst temperature increase control;
  changing the air-fuel ratio in at least one of the remaining cylinders to a lean side, which is higher than a stoichiometric air-fuel ratio, after a temperature of the exhaust gas control apparatus becomes equal to or higher than a determination threshold value determined in advance during the execution of the catalyst temperature increase control; and
  maintaining the air-fuel ratio at the stoichiometric air-fuel ratio prior to and after the catalyst temperature increase control.

9. A hybrid vehicle comprising:
a multi-cylinder engine;
an exhaust gas control apparatus including a catalyst removing exhaust gas from the multi-cylinder engine;
an electric motor; and
an electric power storage device configured to exchange electric power with the electric motor, wherein:
the hybrid vehicle is configured such that at least one of the multi-cylinder engine and the electric motor outputs drive power to wheels; and
the hybrid vehicle further includes
a control device configured to:
  execute catalyst temperature increase control for stopping fuel supply to at least one cylinder and making an air-fuel ratio in each of remaining cylinders other than the at least one cylinder rich in a case when a catalyst temperature is below a predetermined temperature during a load operation of the multi-cylinder engine, execute control such that the electric motor supplements insufficient drive power due to the execution of the catalyst temperature increase control, change the air-fuel ratio in at least one of the remaining cylinders to a lean side, which is higher than a stoichiometric air-fuel ratio, after a temperature of the exhaust gas control apparatus becomes equal to or higher than the predetermined temperature during the execution of the catalyst temperature increase control, and maintain the air-fuel ratio at the stoichiometric air-fuel ratio prior to and after the catalyst temperature increase control.

10. The hybrid vehicle according to claim 9, wherein the at least one cylinder includes an intake valve and an exhaust valve, and control device is configured to execute the catalyst temperature increase control by opening the intake valve and the exhaust valve during the stopping of the fuel supply to the at least one cylinder.

11. The hybrid vehicle according to claim 1, wherein the at least one cylinder includes an intake valve and an exhaust valve, and control device is configured to execute the catalyst temperature increase control by opening the intake valve and the exhaust valve during the stopping of the fuel supply to the at least one cylinder.

12. The hybrid vehicle according to claim 8, wherein the at least one cylinder includes an intake valve and an exhaust valve, and executing the catalyst temperature increase control comprises opening the intake valve and the exhaust valve during the stopping of the fuel supply to the at least one cylinder.

* * * * *